United States Patent [19]
French et al.

[11] Patent Number: 5,794,229
[45] Date of Patent: Aug. 11, 1998

[54] DATABASE SYSTEM WITH METHODOLOGY FOR STORING A DATABASE TABLE BY VERTICALLY PARTITIONING ALL COLUMNS OF THE TABLE

[75] Inventors: Clark French, Pepperell; Peter White, Andover, both of Mass.

[73] Assignee: Sybase, Inc., Emeryville, Calif.

[21] Appl. No.: 570,183

[22] Filed: Dec. 11, 1995

Related U.S. Application Data

[63] Continuation-in-part of Ser. No. 48,637, Apr. 16, 1993, abandoned.
[51] Int. Cl.$^6$ .................................................. G06F 17/30
[52] U.S. Cl. .......................... 707/2; 707/3; 707/10; 707/205; 711/100; 711/171; 705/35
[58] Field of Search .................................. 395/601–612, 395/603; 707/2, 3, 10, 205; 705/35; 711/100, 171

[56] References Cited

U.S. PATENT DOCUMENTS

| | | | |
|---|---|---|---|
| 4,606,002 | 8/1986 | Waisman et al. | 395/603 |
| 4,677,550 | 6/1987 | Ferguson | 395/600 |
| 4,776,026 | 10/1988 | Ueyama | 382/46 |
| 5,153,591 | 10/1992 | Clark | 341/51 |
| 5,293,616 | 3/1994 | Flint | 395/601 |
| 5,377,348 | 12/1994 | Lau et al. | 395/603 |
| 5,404,510 | 4/1995 | Smith et al. | 395/601 |
| 5,495,608 | 2/1996 | Antoshenkov | 395/601 |
| 5,649,181 | 7/1997 | French et al. | 395/603 |

OTHER PUBLICATIONS

"A Transaction–Based Approach to Vertical Partitioning for Relational Database Systems", Chu et al., IEEE, v19, n8, IEEE Transaction of Software Engineering, Aug. 1993.
"RDBMS Maturity", Philip A. Naecker, DEC Professional, v10, n12, p. 44(6) [Available–Online; Dialog File 275], Nov. 1991.
"Ingres Table Sructures", David Snellen, DBMS, v5, n8, p. 60(3) [Available: On–Line; Dialog File 275], Jul. 1992.
Reinartz, K., "*Aspects of vertical mode in multiprocessor systems, unconventional computation on conventional processors,*" Second International Specalist Seminar on the Design and Application of Parallel Digital Processors, IEEE, 1994, pp. 48–54.
Brodie, M. and Manola, F., "*Database Management: A Survey,*" 1987, pp. 1–24.
Hanson–Smith, Ltd., "*Advantage Series System Overview, Ver.* 2.0," 1990, pp. 1–132.

*Primary Examiner*—Thomas G. Black
*Assistant Examiner*—Hosain T. Alam
*Attorney, Agent, or Firm*—John A. Smart

[57] ABSTRACT

A Client/Server Database System with improved methods for performing database queries, particularly DSS-type queries, is described. The system includes one or more Clients (e.g., Terminals or PCs) connected via a Network to a Server. In general operation, Clients store data in and retrieve data from one or more database tables resident on the Server by submitting SQL commands, some of which specify "queries"—criteria for selecting particular records of a table. The system implements methods for storing data vertically (i.e., by column), instead of horizontally (i.e., by row) as is traditionally done. Each column comprises a plurality of "cells" (i.e., column value for a record), which are arranged on a data page in a contiguous fashion. By storing data in a column-wise basis, the system can process a DSS query by bringing in only those columns of data which are of interest. Instead of retrieving row-based data pages consisting of information which is largely not of interest to a query, column-based pages can be retrieved consisting of information which is mostly, if not completely, of interest to the query. The retrieval itself can be done using more-efficient large block I/O transfers. The system includes data compression which is provided at the level of Cache or Buffer Managers, thus providing on-the-fly data compression in a manner which is transparent to each object. Since vertical storage of data leads to high repetition on a given data page, the system provides improved compression/ decompression.

24 Claims, 11 Drawing Sheets

DATABASE SYSTEM WITH METHODOLOGY FOR STORING A DATABASE TABLE BY VERTICALLY PARTITIONING ALL COLUMNS OF THE TABLE

The present application is a continuation-in-part application of commonly-owned application Ser. No. 08/048,637, filed Apr. 16, 1993, now abandoned, the disclosure of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to processing of queries against information stored in a data processing system, such as an SQL Relational Database Management System (RDBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee. Here, each record contains fields designating specifics about the employee, such as name, home address, salary, and the like.

Between the actual physical database itself (i.e., the records contained in data pages stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft™ clients connected to one or more Sybase SQL Server™ database servers. Both Powersoft™ and Sybase SQL Server™ are available from Sybase, Inc. of Emeryville, Calif. As the migration to client/server continues, each day more and more businesses are run from mission-critical systems which store information on server-based SQL database systems, such as Sybase SQL Server™. As a result, increasingly higher demands are being placed on server-based SQL database systems to provide enterprise-wide decision support—providing timely on-line access to critical business information (e.g., through "queries"). Accordingly, there is much interest in improving the performance of such systems, particularly in the area of database query performance.

Traditionally, database management systems (e.g., the above-described client/server database systems) have been employed for on-line transaction processing (OLTP)—posting data (from transactions) to a database table. As part of this process of putting data "in" a database, OLTP systems typically process queries which find a single record, or just a few records. A typical query in an OLTP system, for instance, might be to retrieve data records for a particular customer, such as retrieving records in an airline reservation system for Account No. 35. Thus, use of OLTP systems for retrieving data has been largely limited to moment-to-moment operational needs, where the queries are relatively simple and the number of rows retrieved (relative to table size) is few. In other words, OLTP systems have been optimized for this task of finding a "needle in a haystack"—that is, finding one or few records which meet a given query condition.

More recently, however, there has been great interest in "data warehousing." For these Decision Support Systems (DSS) applications, database systems are designed not so much for putting information "in" (i.e., transaction processing) but more for getting information "out." The general approach to providing DSS has been to take an SQL-based, OLTP database engine (e.g., Sybase or Oracle) which was really architected for the OLTP environment (and the model that it represents) and attempt to extend that engine to handle DSS applications. As a result of the effort to build DSS functionality on top of OLTP database engines, the performance of present-day DSS products is generally poor. Quite simply, OLTP database engines have been architected and optimized for transaction processing to such an extent that they are not well-suited for analytical processing.

Alternatively, some vendors have implemented non-SQL-based systems providing DSS capability. These systems exist today, in large part, due to the failure of SQL-based database systems at processing DSS tasks. Examples of these non-SQL or "on-line analytical processing" (OLAP) systems include Pilot™ and Comshare™. These systems employ a non-relational model, one which generally allows the user to view the data in a cube-like form. Typically, data records are imported from SQL databases and then stored in various proprietary formats. Once transposed from SQL format into a particular proprietary format, the information is usually maintained on one or more servers for access by clients, through a proprietary interface. These systems typically employ proprietary clients or front ends as well.

This approach also entails significant disadvantages, however. Users prefer to not have to import and/or transpose information into various proprietary formats. Instead, user would rather simply keep the information in SQL database tables. There are at least two reasons for this. First, the information is generally "already there," having been accumulated by the posting of transactions over a period of time. Second, users are already familiar with working with one of the main SQL database providers, such as Sybase or Oracle. Even if a separate tool is required to implement DSS, users prefer to work with tools which are in the same family as the tools which they are already using on a day-to-day basis. Expectedly, the non-SQL approach has met with limited success.

What is needed are system and methods with better DSS performance, yet within the traditional SQL/relational model—a model which users demand. From the perspective of users, such a system should appear to be essentially an SQL-based relational system. At the same time, however, such a system should yield much-improved DSS performance. The present invention fulfills this and other needs.

SUMMARY OF THE INVENTION

The present invention comprises a Client/Server Database System with improved methods for performing database queries, particularly DSS-type queries. In an exemplary embodiment, the system includes one or more Clients (e.g., Terminals or PCs) connected via a Network to a Server. The Server, operating under a server operating system (e.g., UNIX), includes a Database Server System. In general operation, Clients store data in and retrieve data from one or more database tables resident on the Server by submitting SQL commands, some of which specify "queries"—criteria for selecting particular records of a table.

According to the present invention, data is not stored in a row or a horizontal orientation, as is traditionally done, but is instead stored vertically (i.e., by column). By storing data in a column-wise basis, the system of the present invention can process a DSS query by bringing in only those columns of data which are of interest. A DSS query typically entails looking at 50% or greater of the data and often includes GROUP BY clauses (e.g., on State or Gender) and includes SUM, COUNT, and AVG clauses (e.g., average on Revenue). Processing such a query using traditional storage methodology is highly inefficient, as row-based (horizontal) data pages bring in from disk all columns of data, whether or not particular columns are of interest to the query. Thus for DSS queries, storing data on a column basis by cell is far more preferable than storing data in the traditional row or record format.

Since the vast majority of information in real-world DSS applications is typically low cardinality data (e.g., State field has only 50 unique values, the majority of the columns of a typical DSS table will store low cardinality data on each vertical data page. As a result, repetition within a particular column is quite high, thus leading to far better compression of data pages than can be realized than with row-based storage. The nature of the data encountered, therefore, further enhances the advantages of column-wise storage or vertical partitioning.

In a typical DSS query, a database system needs to bring in large amounts of information; these queries typically look at a large percentage of the database. If the data pages actually brought in for the DSS query are populated largely or completely with information necessary for the query, then I/O block size may be increased to a level which is optimal for the environment/platform, such as to a level of 64K data pages. More particularly, by storing information in a column-based format, in accordance with the present invention, a high saturation level of information (such as required by a DSS query) can be efficiently met. Instead of retrieving row-based data pages consisting of information which is largely not of interest to a query, column-based pages can be retrieved consisting of information which is mostly, if not completely, of interest to the query. The retrieval itself can be done using more-efficient large block I/O transfers.

In the system of the present invention, from an SQL system catalog, the system can determine a chain of columns which represent a particular table. Specifically, from the chain of columns, the system can represent a logical table to the user. Here, the concept of a "table" in the system of the present invention is purely a catalog logical entry, as opposed to a physical entity in which it traditionally exists. The columns are "tied together" logically to represent a table. From the perspective of the user, however, the vertical partitioning is transparent.

Each column comprises a plurality of "cells" (i.e., column value for a record), which are arranged on a data page in a contiguous fashion. For fixed-length fields (e.g., two character State field), the offset of any particular cell on a page can be quickly computed as a modulus of that cell (adjusted for any header information to the page). Between the individual cells, there is no overhead information, in contrast to several row-based implementations. Since the cells, in essence, exist as a solid stream of data, column scans are particularly efficient.

The pages are further optimized for compression by storing in the page header a status flag indicating whether the data page is a candidate for compression and (optionally) what type of compression is best suited for the data on that page. Since this is settable on a page-by-page basis, one particular compression technique can be applied on one column yet at the same time another compression technique applied on another column (or a different part of the same column), all within the same (logical) table.

Data compression is added to the system at the level of the Cache or Buffer Managers. It is preferable to isolate compression here so that each object need not be concerned about compressing itself (or even being aware that compression is occurring). As a result, compression is transparently added to all data objects managed by Buffer Managers. The data pages of an object are compressed when sent out to disk and decompressed when retrieved from disk, yet the object itself is unaware of this action.

Most objects within the system, such as tables, indexes, logs, and the like, exist as pages. As these objects are streamed to disk, each simply requests its Buffer Manager to store the object on disk. The Manager in turn stores the object on disk using the best compression methodology known to it, for the given object. In this manner, data compression is transparent to the data objects above the level of the Buffer Manager.

To address the potential problem of a modified block no longer compressing back down to its original size, a "block map" is employed in the system of the present invention. Within a Buffer Manager, there can be as many instances of a block map as needed. Typically, one exists per object (or portion thereof). For instance, one block map can exist per B-Tree, or one per portion of a B-Tree (e.g., non-leaf level pages). Each block map, in turn, may be thought of as a logical-to-physical translator for the object (or subobject) which is its focus. In this manner, the system can concentrate on bringing in the object (or portion of the object) which is needed. Each page number provided to a client serves as an index into the corresponding block map for determining the actual physical page number. For implementations without compression, this translator may be eliminated.

DETAILED DESCRIPTION OF A PREFERRED EMBODIMENT

The following description will focus on the presently preferred embodiment of the present invention, which is operative in a network environment executing client/server database applications. The present invention, however, is not limited to any particular application or environment. Instead, those skilled in the art will find that the present invention may be advantageously applied to any application or environment where optimization of query performance is desirable, including non-SQL database management systems and the like. The description of the exemplary embodiments which follows is, therefore, for the purpose of illustration and not limitation.

Standalone System Hardware

Figure 1A:
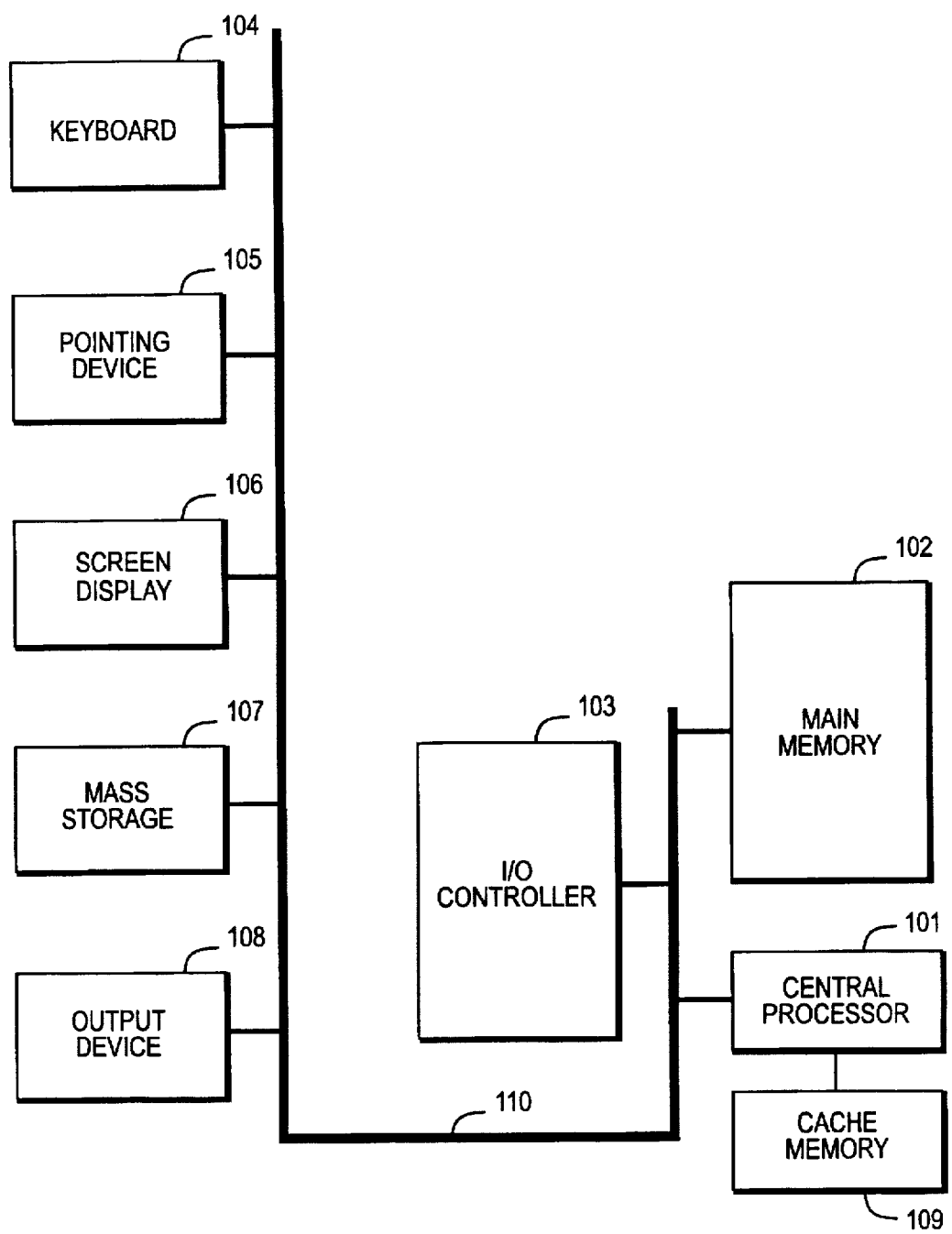
FIG. 1A is a block diagram of a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, removable disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
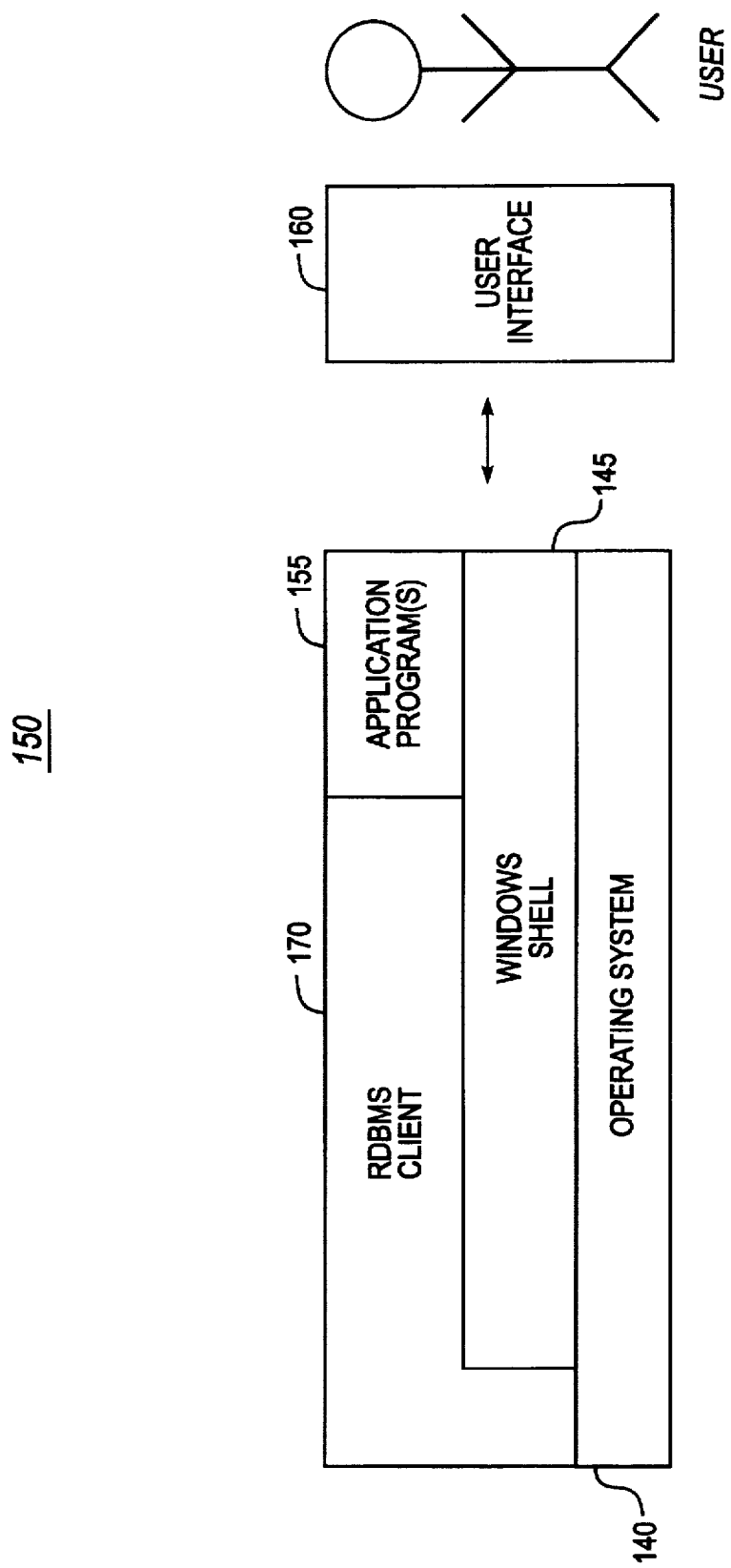
FIG. 1B is a block diagram of a software subsystem for controlling the operation of the computer system of FIG. 1A.

Illustrated in FIG. 1B, a computer software system 150 is provided for directing the operation of the computer system 100. Software system 150, which is stored in system memory 102 and on mass storage or disk memory 107, includes a kernel or operating system (OS) 140 and a windows shell 145. One or more application programs, such as application software programs 155, may be "loaded" (i.e., transferred from storage 107 into memory 102) for execution by the system 100. The system also includes a user interface 160 for receiving user commands and data as input and displaying result data as output.

Also shown, the software system 150 includes a Relational Database Management System (RDBMS) front-end or "client" 170. The RDBMS client 170 may be any one of a number of database front-ends, including PowerBuilder™, dBASE®, Paradox®, Microsoft® Access, or the like. In an exemplary embodiment, the front-end will include SQL access drivers (e.g., Borland SQL Links, Microsoft ODBC drivers, Intersolv ODBC drivers, and the like) for accessing database tables from an SQL database server operating in a Client/Server environment.

Client/Server Database Management System

Figure 2:
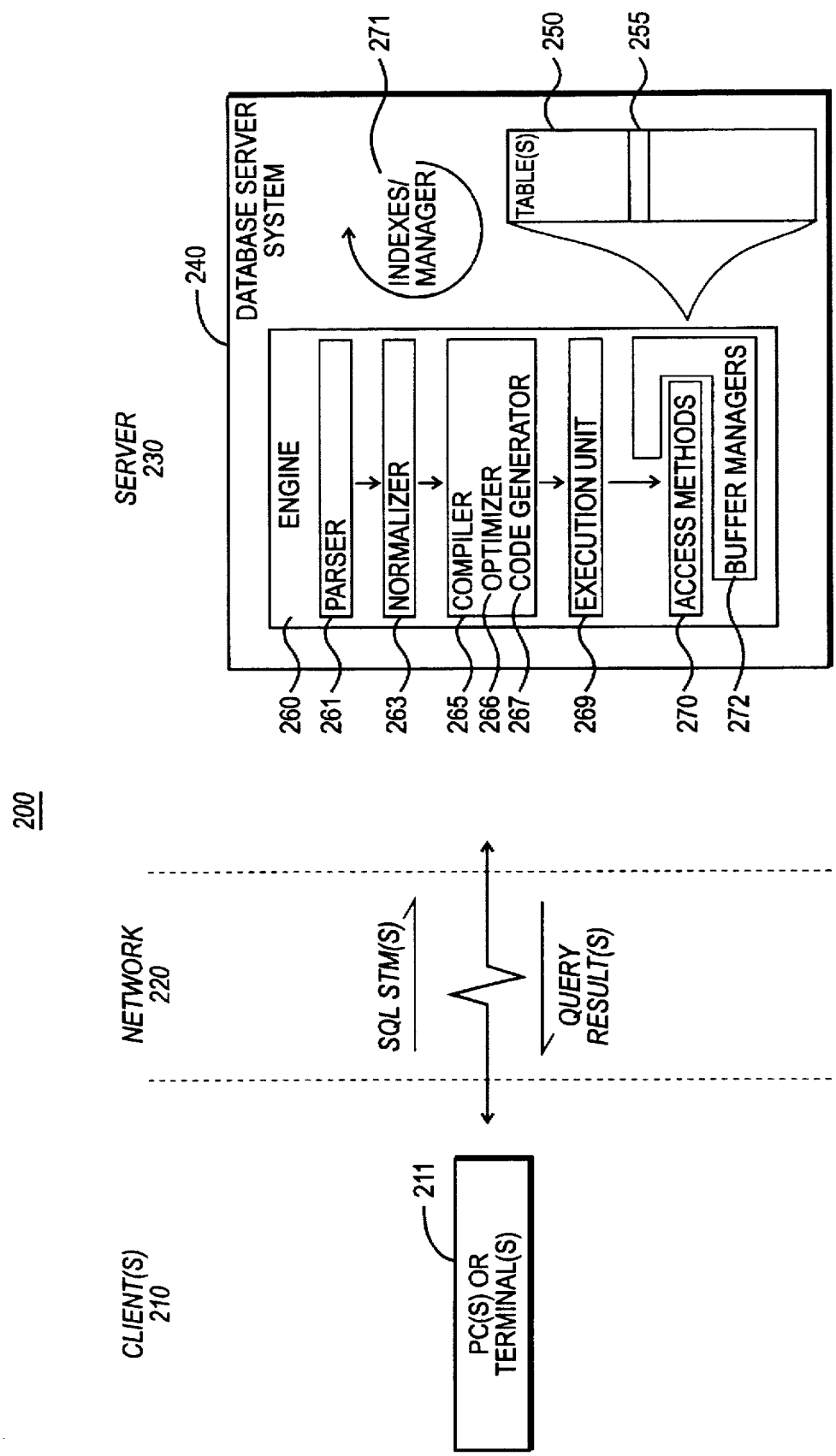
FIG. 2 is a block diagram of a client/server system in which the present invention is preferably embodied.

While the present invention may operate within a single (standalone) computer (e.g., system 100 of FIG. 1A), the present invention is preferably embodied in a multi-user computer system, such as a Client/Server system. FIG. 2 illustrates the general structure of a Client/Server Database System 200 suitable for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase SQL Server™ (available from Sybase, Inc. of Emeryville, Calif.) in an exemplary embodiment, generally operates as an independent process (i.e., independently of the Clients), running under a server operating system such as Microsoft Windows NT (Microsoft Corp. of Redmond, Wash.), NetWare (Novell of Provo, UT), UNIX (Novell), or OS/2 (IBM). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client calls in the well-known SQL (Structured Query Language) together with any parameter information into a format (of one or more packets) suitable for transmission across a cable or wire, for delivery to the Database Server System 240.

Client/server environments, database servers, and networks are well documented in the technical, trade, and patent literature. For a discussion of database servers and client/server environments generally, and SQL Server™ particularly, see, e.g., Nath, A., *The Guide to SQL Server*, Second Edition, Addison-Wesley Publishing Company, 1995. Additional documentation of SQL Server™ is available from Sybase, Inc. as *SQL Server Documentation Set* (Catalog No. 49600). For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, UT. The disclosures of each of the foregoing are hereby incorporated by reference.

In operation, the Client(s) 210 store data in or retrieve data from one or more database tables 250, shown in FIG. 2. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example. Position is one field, Date Hired is another, and so on. With this format, tables are easy for users to understand and use. Moreover, the flexibility of tables permits a user to define relationships between various items of data, as needed.

In operation, the Client(s) issue one or more SQL commands to the Server. SQL commands may specify, for instance, a query for retrieving particular data (i.e., data records meeting the query condition) from the table 250. The syntax of SQL (Structured Query Language) is well documented; see, e.g., the above-mentioned *An Introduction to Database Systems*. In addition to retrieving the data from Database Server tables, the Client(s) also include the ability to insert new rows of data records into the table; Client(s) can also modify and/or delete existing records in the table.

For enhancing the speed in which the Database Server stores, retrieves, and presents particular data records, the Server maintains one or more database indexes 271 on the table, under control of an Index Manager. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file. Alternatively, instead of storing unique record numbers, a "clustered" index may be employed. This is an index which stores the data pages of the records themselves on the terminal or leaf-level nodes of the index.

In operation, the SQL statements received from the one or more Clients 210 (via Network 220) are processed by Engine 260 of the Database Server System 240. The Engine 260 itself comprises a Parser 261, Normalizer 263, Compiler 265, Execution Unit 269, Access Methods 270, and Buffer Manager(s) 272. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization includes, for example, the elimination of redundant data. Additionally, the Normalizer 263 performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods 270 being invoked during query execution.

The Code Generator 267, on the other hand, converts the query tree into a set of instructions suitable for satisfying the query. These instructions are passed to the Execution Unit 269. Operating under the control of these instructions, the Execution Unit 269 generates calls into lower-level routines, such as the Access Methods 270, for retrieving relevant information (e.g., row 255) from the database table 250. The Access Methods operate in conjunction with the Buffer Managers to access the data, as required by the query plan. After the plan has been executed by the Execution Unit, the Server returns a query result or answer table back to the Client(s).

Improving Decision Support query performance in an SQL-based database system

The following description will focus on specific modifications to an SQL-based database server, such as System 240, for providing improved Decision Support query performance.

A. DSS queries require a different design approach

The present invention recognizes that the previously-described "needle-in-a-haystack" approach to information retrieval employed in OLTP environments is not well-suited for Decision Support Systems (DSS) applications. DSS applications, such as those used in conjunction with providing a "data warehouse," are employed for more analytical information processing. Instead of employing a simple query for pulling up records of a particular customer, a DSS query typically seeks information of a more general nature. A typical DSS query would, for instance, ask how many customers living in Massachusetts purchased more than thirty dollars of merchandise over the past year. To satisfy a query of this nature, a database system would have to examine a large percentage of the actual warehouse data, not just a few records.

In fact, the individual records found in a DSS query are often not of interest to the user. Instead, users are generally interested in trends—summary-level information. In typical operation, therefore, data reduction is performed on the query result by performing aggregation. In aggregation, the data records are grouped by one or more criteria of interest, such as grouped by state, by gender, by age, or the like. At the bottom of each group a summary is presented on the particular category of interest, such as total revenue (for that particular group). Here, the sum of a particular category is more of interest to the user than the detail records of the particular transactions which contributed to that sum.

The poor performance of OLTP systems in providing DSS stems from the architecture and design considerations underlying these systems. Quite simply, OLTP database engines have been architected and optimized for transaction processing to such an extent that they are not well-suited for analytical processing. The problem is due, in part, to how information is actually stored in OLTP systems. Such systems store rows of records arranged in a list of data pages (i.e., page "chain"). That approach is well-suited for transaction processing. When a system needs to retrieve a particular record, it need only bring in the corresponding data page which stores that record. If, on the other hand, analytical processing is required, this horizontal approach (i.e., storing particular rows to each data page) hampers system performance. A DSS query might, for instance, require the system to examine values in a particular column (or a few columns). Since the information is stored by row (i.e., horizontally) and not by column (i.e., vertically) in OLTP systems, those systems have to bring in all data pages in order to perform the DSS query. The underlying storage mechanism employed in OLTP systems, while perhaps optimal for transaction processing, is clearly suboptimal for Decision Support applications. Typical DSS queries look at several tables but only a small number of columns (relative to the total number of columns for a table). A system using the OLTP approach to storing data would have to bring in a multitude of data pages—data pages which largely consist of information which is simply not of interest in DSS queries.

One approach to addressing the foregoing problem is to attempt to satisfy the query by using one or more indexes which might be available. The approach does not suffice for typical DSS queries, however. The particular problem is that most DSS queries are looking at a large percentage of the data, on the order of 50% to 80% of the data (or even more). OLTP systems, when faced with such a query, generally revert to table scans instead of attempting index processing/ maintenance on a relatively large percentage of the data. Moreover, given the format in which information is stored in OLTP systems, queries which touch more than 10% of the data generally require the retrieval of all data pages. Indexing techniques are not, therefore, a viable solution to addressing the inefficiencies incurred by imposing OLTP storage methodology on DSS applications.

Other areas of OLTP and DSS differ to such an extent that they are opposing. The traditional B-Tree indexing techniques in use today by OLTP database vendors only do two things well, from a DSS standpoint. First, B-Tree index techniques allow the quick update of individual records, so that any individual record can be modified quickly. Second, B-Tree indexing techniques allow a system to find a particular record quickly (i.e., the "needle-in-a-haystack" problem). Unfortunately for users, most DSS queries do neither one and are, thus, largely unable to benefit from B-Tree indexing techniques. As a result, using traditional indexing techniques in DSS applications generally yields no benefits (and might even degrade system performance).

Another area where the corresponding physics of OLTP and DSS diverge is in the area of query bit maps. As in known in the art, a bit map (bitmask) can be constructed in response to a query for indicating which records satisfy the query condition. For OLTP queries, such bit maps are generally inefficient—a relatively large bitmap is required to represent a solution set of few records. When a file set is large, however, such as in a DSS query, bit maps are generally very efficient. Again, the underlying dynamics or "physics" of the two models are opposing.

Yet another area where the design of OLTP systems is poorly suited to supporting DSS is in the area of I/O (input/output) transfers. In OLTP systems, since information is usually being written to and read from disk one or few records at a time, I/O block size is generally not large, on the order of about 2K to 4K. The general notion is that, if a data page holds on the order of 50 to 100 records and only one of those records is needed, it is generally better to have smaller pages (for more efficient I/O retrieval of a lesser amount of information needed off that page).

A typical DSS query, in contrast, needs to bring in large amounts of information; these queries typically look at a large percentage of the database. If the data pages actually brought in for the DSS query are populated largely or completely with information necessary for the query, then I/O block size may be increased to a level which is optimal for the environment/platform, such as to a level of 64K data pages. More particularly, by storing information in a column-based format, in accordance with the present invention, a high saturation level of information (such as required by a DSS query) can be efficiently met. Instead of retrieving row-based data pages consisting of information which is largely not of interest to a query, column-based pages can be retrieved consisting of information which is mostly, if not completely, of interest to the query. The retrieval itself can be done using more-efficient large block I/O transfers. This recognizes that DSS queries often touch a wide span of records, but only particular columns of those records. Therefore, when data is rearranged to optimize data storage for DSS applications—storing on a column-by-column basis in accordance with the present invention—the data pages brought in comprise largely (if not completely) the information which is sought.

Moreover, instead of retrieving a multitude of small blocks (e.g., 4K blocks) as would be done in an OLTP system, a system modified in accordance with the present invention can retrieve more data in relatively few large block (e.g., one block). It is far more efficient for a system to bring these in, for instance, one 64K block instead of sixteen 4K blocks. Larger block sizes force a larger amount of data (i.e., the data stored on the now larger page) to be stored contiguously on a storage device (disk). As a result, retrieval is optimized by transfer of a single contiguous unit (e.g., disk sector), instead of requiring the system to transfer multiple smaller units scattered across different sectors of a storage device.

B. Specific design problems to address

Implementing a DSS system with much improved performance yet in the confines of relational databases poses particular problems which must be solved. First, queries must execute faster. The query execution speed currently being realized with existing OLTP implementations is simply too slow for most users. Second, if indexing methodology is employed it must be computationally inexpensive relative to, say, just scanning tables. For database systems typically employed for OLTP and for DSS, tables are sufficiently large that index creation and maintenance is problematic. For instance, to build an index on a table of one million records with about fifteen rows takes on the order of ten to fifteen minutes (e.g., using Sybase or Oracle OLTP systems). The second problem is, therefore, to make the cost of indexing (including build times) cheaper.

A third problem which must be addressed is the size of indexes. In conventional systems, the size of an index is generally 2.5 to 3 times the size of the data (e.g., column values) that the index is being built on. This results from the fact that indexes store not only values of the data (i.e., key values) but also the indexing overhead, namely pointers (i.e., pointers to other nodes and tuple IDs for the underlying records). Consider, for example, an index on a State column field, storing each State as a two letter abbreviation (e.g., CA for California). The B-Tree overhead and tuple IDs add about 16 to 20 bytes for each piece of information (i.e., column value from a particular record), despite the fact that the underlying information is only two characters long. Even if key values are reduced by compression (e.g., leading-key or "prefix" compression), the B-Tree overhead (e.g., 16 bytes per record) still remain. The storage space required for indexes may add substantially to system costs. Consider a 100-gigabyte table. The storage requirements for indexes, using traditional approaches, adds an additional 300 to 500 gigabytes storage requirement. Even at today's relatively low price of $700 per gigabyte, such requirements add substantial costs to systems.

Further, in OLTP systems, practically the only way conventional B-Tree indexes may be employed to advantage for DSS queries is by using concatenated indexes, that is an index on multiple fields (e.g., index on Last Name plus First Name). The problem with the technique, however, is that queries will not necessarily match the combination forming the concatenated or composite index. Consider a table with 100 columns and a query with a three-term WHERE clause and a GROUP BY on five unique fields. The chance that a database administrator (DBA) would have predicted the need for this particular concatenated index for a particular query is low. The hallmark of DSS queries is their ad hoc nature. Users of a data warehouse are generally not running canned, pre-determined queries. As a result, it is unlikely that meaningful concatenated indexes will be available in these environments for handling DSS queries. Even worse, the storage requirements for concatenated indexes exceeds (and may profoundly exceed) that of simple indexes. All told, concatenated indexes are not particularly helpful in DSS, particularly in view of their storage requirements.

Another problem exists in the area of incremental loads. It is well known for any of the relational database indexing techniques that in the face of significant inserts of records (in bulk) to the table it is cheaper to simply "drop" indexes and rebuild them later. Consider a table of 10 million rows to which the user wishes to insert 1 million records. It is cheaper to drop all indexes, load the extra 1 million records, and then recreate all indexes from scratch on the full table (now, 11 million records), than it is to have the database system add the 1 million records with indexes active. This results from the fact that B-Trees, in such a situation, are huge, with working sets for each of them often exceeding physical memory. If, in such an instance, 50 indexes existed on the table, adding one row would lead to 50 I/O operations. The design consideration attendant to incremental loads is to ensure that subsequent loads do not incur substantially more expense. In the foregoing example, for instance, a subsequent load of a second million records should occur as cheaply or nearly as cheaply as the load of the first million records.

C. Modification in accordance with the present invention

1. Index manager

Recall that the traditional B-Tree indexing technique does not work well for the kind of queries encountered in DSS— that is, large file set queries (i.e., ones with much aggregation/grouping). In other words, DSS queries are generally complex queries which touch a large percentage of the database; these queries are not the "needle-in-a-haystack" query problem. A different approach is required.

According to the present invention, the Index Manager is "taught more" about the problem or query at hand. In a conventional system (e.g., Oracle), the Query Optimizer generally asks the indexes only simple questions, such as "what is the record for Account No. 35?" In the system of the present invention, in contrast, additional complexity has been pushed from the Optimizer down to a level which is closer to the data. In addition to requests for returning a particular record (e.g., return the record for Account No. 35) in the system, operations such as SUM, AVG, MIN, MAX, COUNT DISTINCT, and the like are performed at the level of the data objects (e.g., data pages). Because the indexes understand the distribution of the data, the cardinality of the data, the range of values of the data, and the like, the indexes are much closer to the physical problem. They understand the physical nature of that column's attributes. As a result, they are better suited for these types of operations.

In the case of the low cardinality value-based indexing technique, doing a GROUP BY is computationally cheap, because the index is ordered by group. Similarly, COUNT DISTINCT is computationally cheap; COUNT DISTINCT is another way of grouping things. SUM is also reasonably cheap. Consider a query on the number of dependents, a low cardinality field (e.g., values ranging from 1 to 10). Here, the system need only access the corresponding bit maps (i.e., 10 bit maps) for quickly determining how many bits are on. The Index Manager is modified to include an interface which allows it to receive some of the query information returning a page and offset for a given key value.

2. Data storage: vertical partitioning

Also according to the present invention, data is not stored in a row or a horizontal orientation but is, instead, stored vertically (i.e., by column). This is perhaps best explained by first considering the type of query generally encountered in DSS applications. Consider the following:

```
SELECT Age, Gender, SUM(Revenue), COUNT(*)
    FROM Customers
    WHERE State IN ('MA', 'NY', 'RI', 'CT')
    AND Status = 'Active'
    GROUP BY Age, Gender;
SELECT State, Product, SUM(Revenue), AVG(Price)
    FROM Customers
    WHERE Product <> 'b'
    AND Code = 1
    GROUP BY State, Product
```

In such a query—one which is typical for DSS—storing data on a column basis by cell is far more preferable than storing data in the traditional row or record format. The foregoing query entails looking at 50% or greater of the data and includes GROUP BY clauses (e.g., on State or Gender) and includes SUM, COUNT, and AVG clauses (e.g., average on Revenue). Processing such a query using traditional storage methodology is highly inefficient, as row-based (horizontal) data pages bring in from disk all columns of data, whether or not particular columns are of interest to the query.

By storing data in a column-wise basis, the system of the present invention can process the foregoing query by bringing in only those columns of data which are of interest. Further, storing data in a column-wise basis leads to high repetition of data and, thus, far better compression than can be realized with row-based storage. Moreover, it has been observed that the vast majority of information in real-world DSS applications is low cardinality data; for example, a State field has only 50 unique values. The majority (e.g., 80% or more) of the columns of a typical DSS table will store low cardinality data. As a result, repetition within a particular column is quite high. The nature of the data encountered, therefore, further enhances the advantages of column-wise storage or vertical partitioning.

Figure 3A:
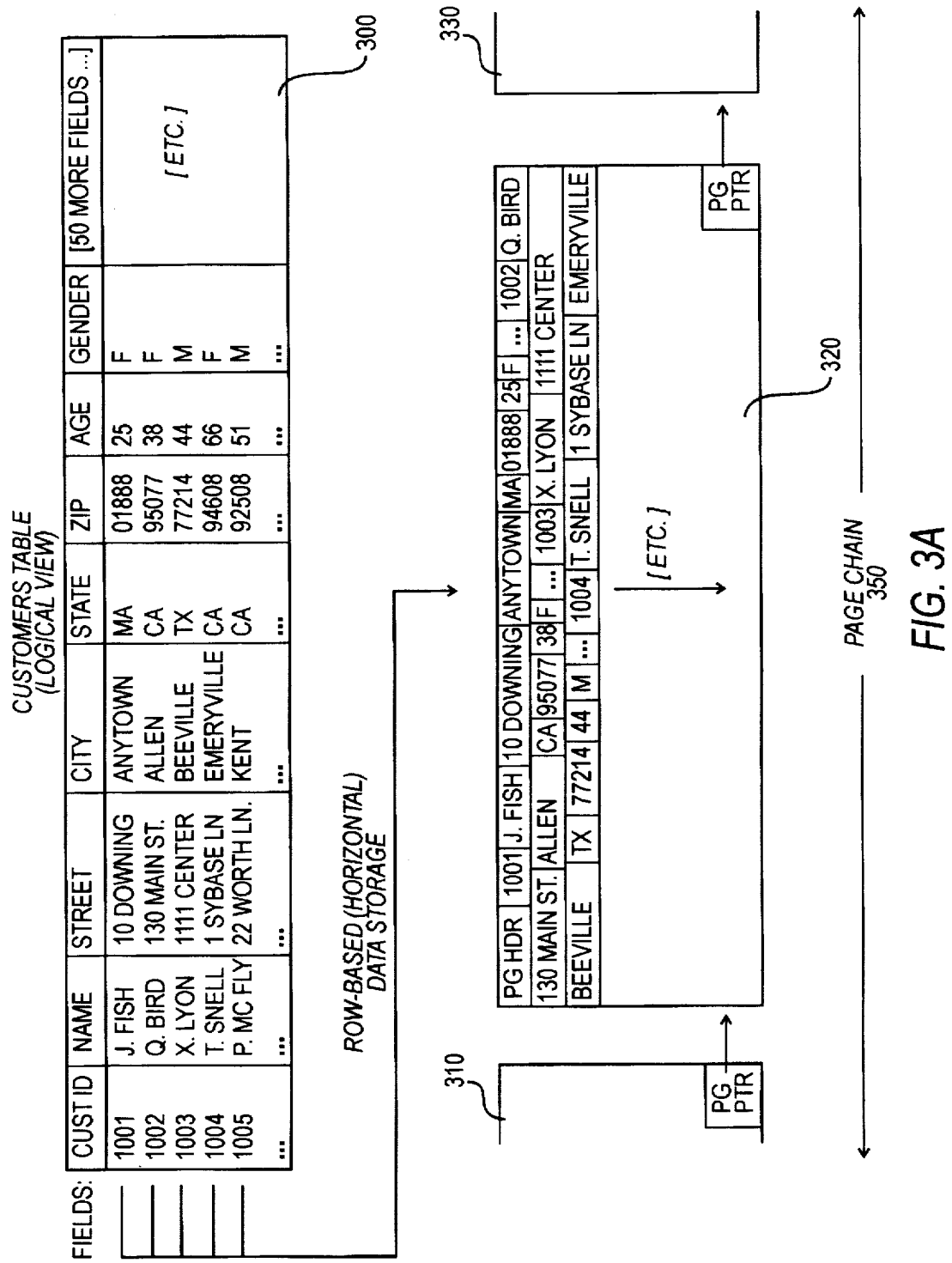
FIGS. 3A–C are diagrams illustrating column-based data storage or "vertical partitioning," which is employed for storing data tables in the system of the present invention.
Figure 3B:
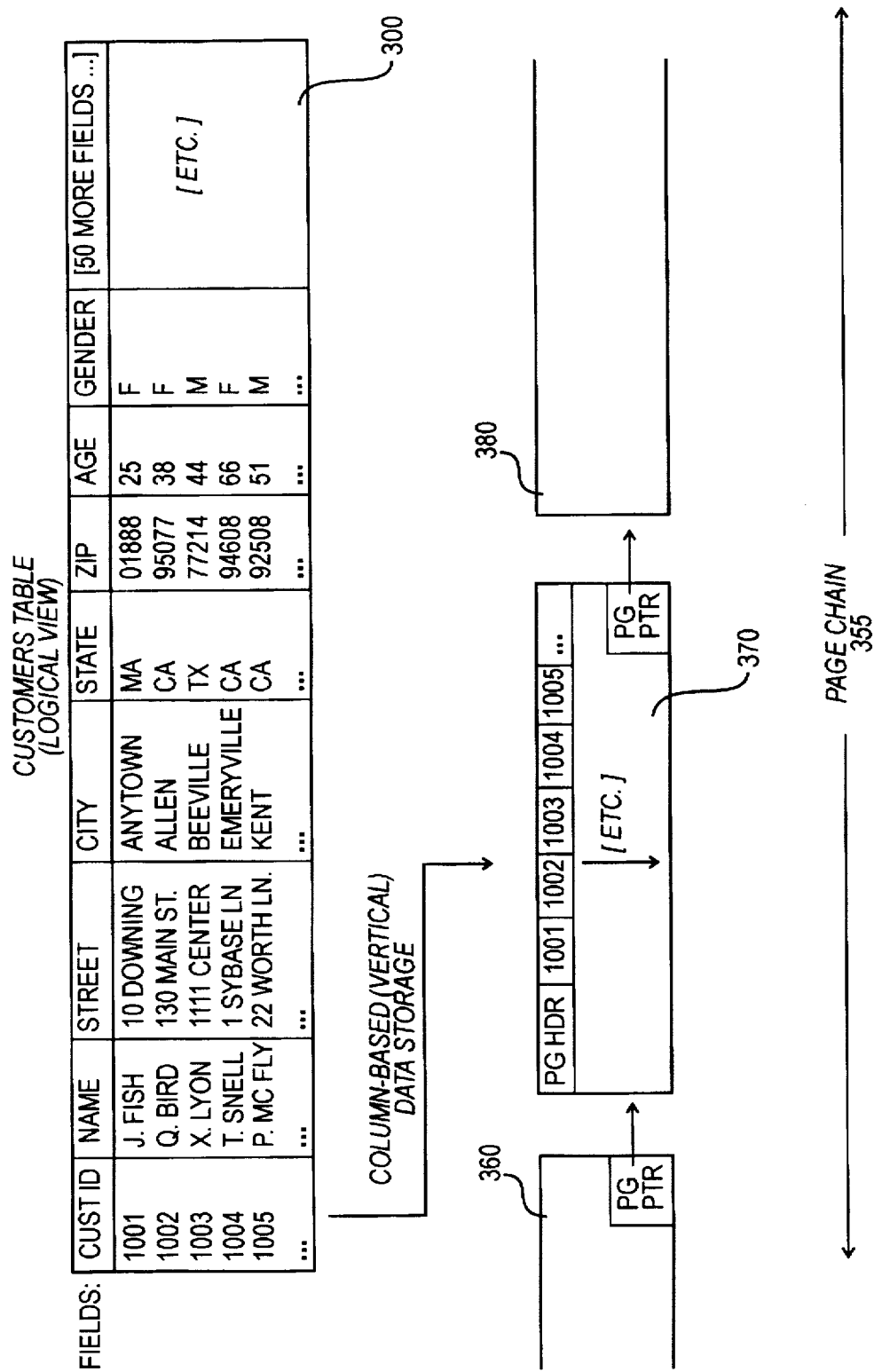
Figure 3C:
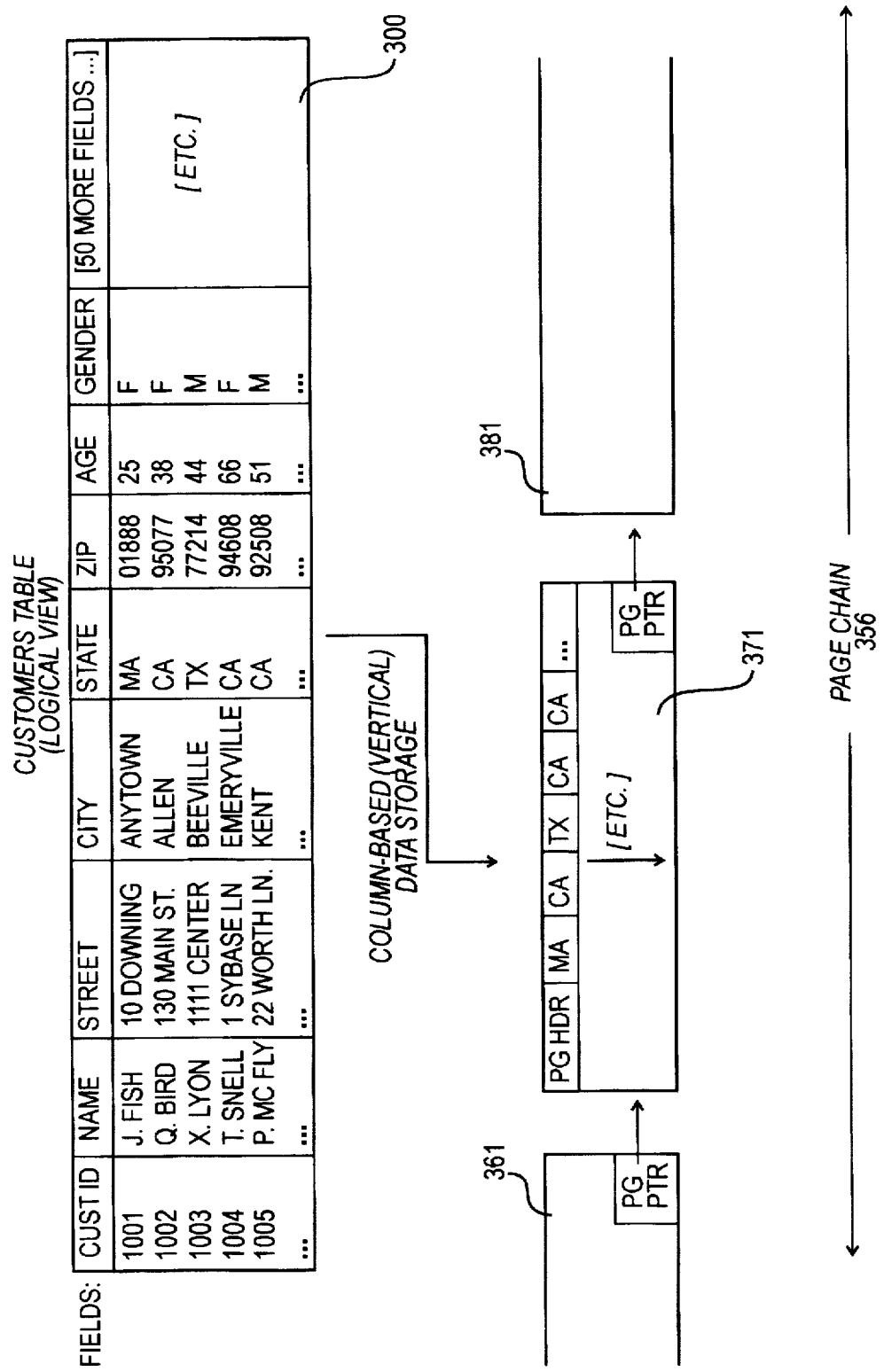

Referring now to FIGS. 3A–C, vertical partitioning or column-based storage in accordance with the present invention will now be diagrammatically illustrated. FIG. 3A shows Customers table as a logical view—that is, a table view in familiar column/row format. As shown, the table 300 includes fields of Customer (Cust) ID, Name, Street, City, State, Zip, Age, Gender, and so forth and so on. For tables employed for DSS purposes, it is not uncommon for tables to include 50 or more fields. Moreover, a large number of rows is typical for tables employed for DSS purposes, often exceeding 1 million rows.

As shown in FIG. 3A, row-based (horizontal) data storage of the table 300 entails storing each row in a data page, such as the data page 320. In particular, the data page 320 comprises a page header (e.g., storing housekeeping information) and one or more rows from the table 300. As shown in particular detail, the data page 320 lays down each row in its data page, one after another. Within each of the rows stored in the data page is the collection of particular data values for that row (i.e., record).

The data page 320 is conventionally connected to other data pages, such as data page 310 (left neighbor) and data page 330 (right neighbor). In this manner, the pages form a single page chain 350. Actual connection between the pages is typically achieved using conventional page pointers, such as the forward-referencing page pointers shown for page 310 (i.e., which points to page 320) and for page 320 (i.e., which points to page 330).

Modification of data storage, in accordance with the present invention, is shown in particular detail in FIG. 3B. Instead of storing the data members of each row together on a data page, the data members for each column are stored together as "cells" on a data page. As shown in FIG. 3A for the table 300, for instance, the Customer (Cust) ID column values are stored together on data page 370. Like the row-based data page (e.g., data page 320), the column-based data page 370 includes a page header (e.g., for housekeeping information) and a page pointer. The data page 370 is connected to other data pages which store Customer (Cust) ID column values, such as data page 360 and data page 380, for forming page chain 355, as shown. As before, each data page may include a page pointer for referencing the next data page in the page chain.

In a similar manner, other columns may be stored. As shown in FIG. 3C, for instance, the State field of table 300 is stored in a page chain 356, with each page in the chain storing State data values in cells. As shown in the figure, for instance, each particular State data value (i.e., one column value for each row in logical view 300) is stored in a cell of data page 371. The data page 371 may be connected or linked to other data pages (in a manner similar to that previously shown), such as data page 361 and data page 381 for forming the page chain 356. Both the data pages of FIG. 3B and of FIG. 3C are shown in uncompressed format. For data which is suitable for compression, however, the data would be compressed before stored on data pages, as described in further detail hereinbelow.

Figure 4A:
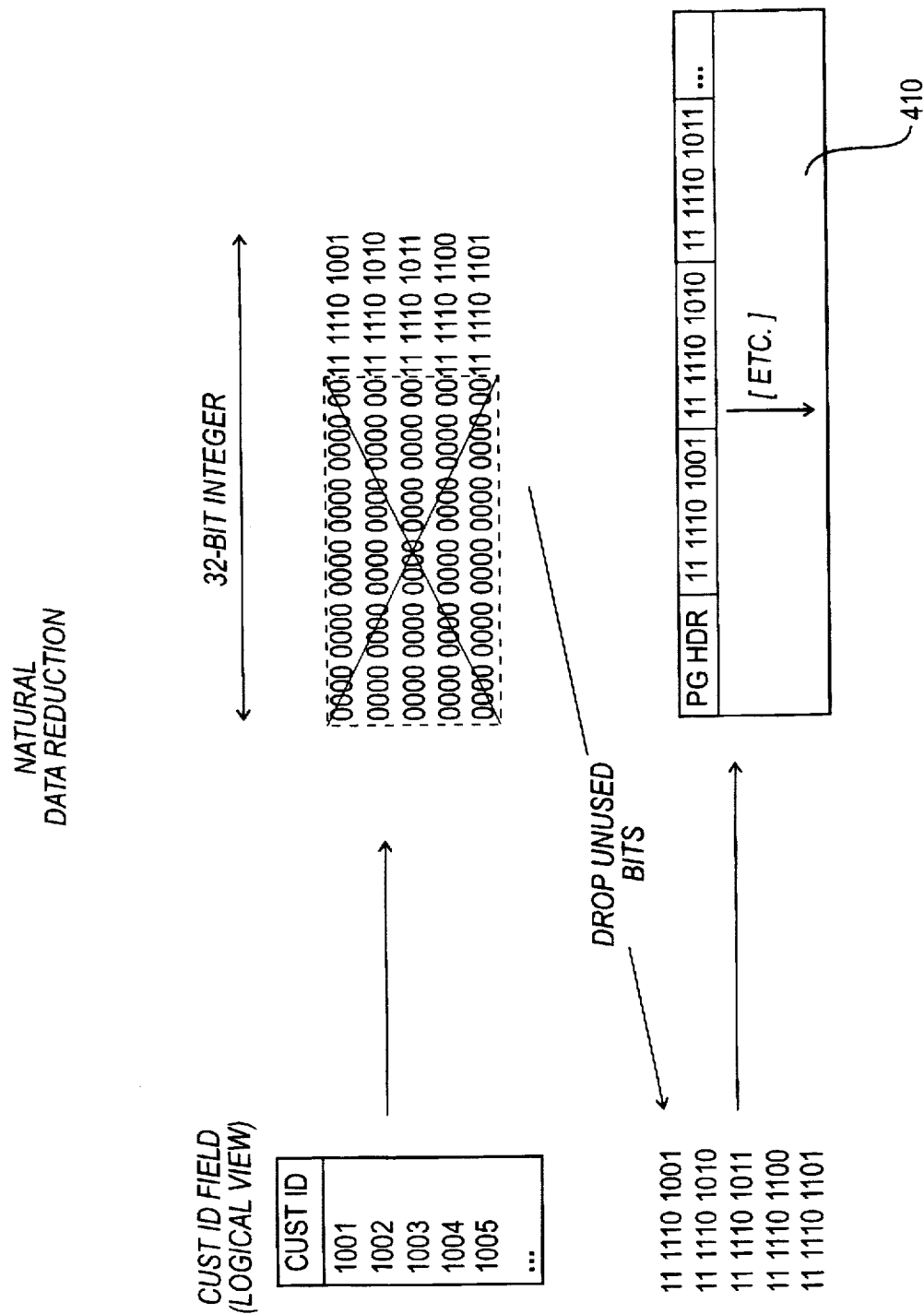
FIGS. 4A–D are diagrams illustrating "natural data reduction" compression of data types which would otherwise include unused bits; natural data reduction may be combined with other compression methodologies, as shown particularly in FIG. 4B.

Referring now to FIGS. 4A-D, a first level of data compression—natural data reduction—in accordance with the present invention will now be described for vertically stored data. Before conventional compression methodology is applied to the column data values, the present invention recognizes that, given the new format for storing data (i.e., vertically), many data types may be subjected to a "natural data reduction." Consider the data values from the Customer (Cust) ID field, as shown in FIG. 4A. Typically, these whole number or integer values would be represented in most digital computer implementations as 32-bit (or more) integers. A 32-bit integer has the capability of representing a Customer ID up to about four billion. The user's actual data, however, never approaches this limit. As a result, a large number of the bits employed for representing Customer ID data values are simply unused bits, as shown in FIG. 4A. In accordance with the present invention, therefore, these unused bits may be dropped for achieving a first level of data compression. For storage of customer ID, for instance, the first 20 bits may be dropped from each data value upon storage in the data page. This is shown in particular detail for the data page 410 of FIG. 4A. When the data value is restored from the data page (i.e., expanded from a cell on the data page to a data value in memory), the data value can be re-expanded to its native size (e.g., 32-bit integer), so that it can participate as a data member of the appropriate size (i.e., for its data type), thus keeping the natural data reduction compression transparent when the data is used by the client.

Figure 4B:
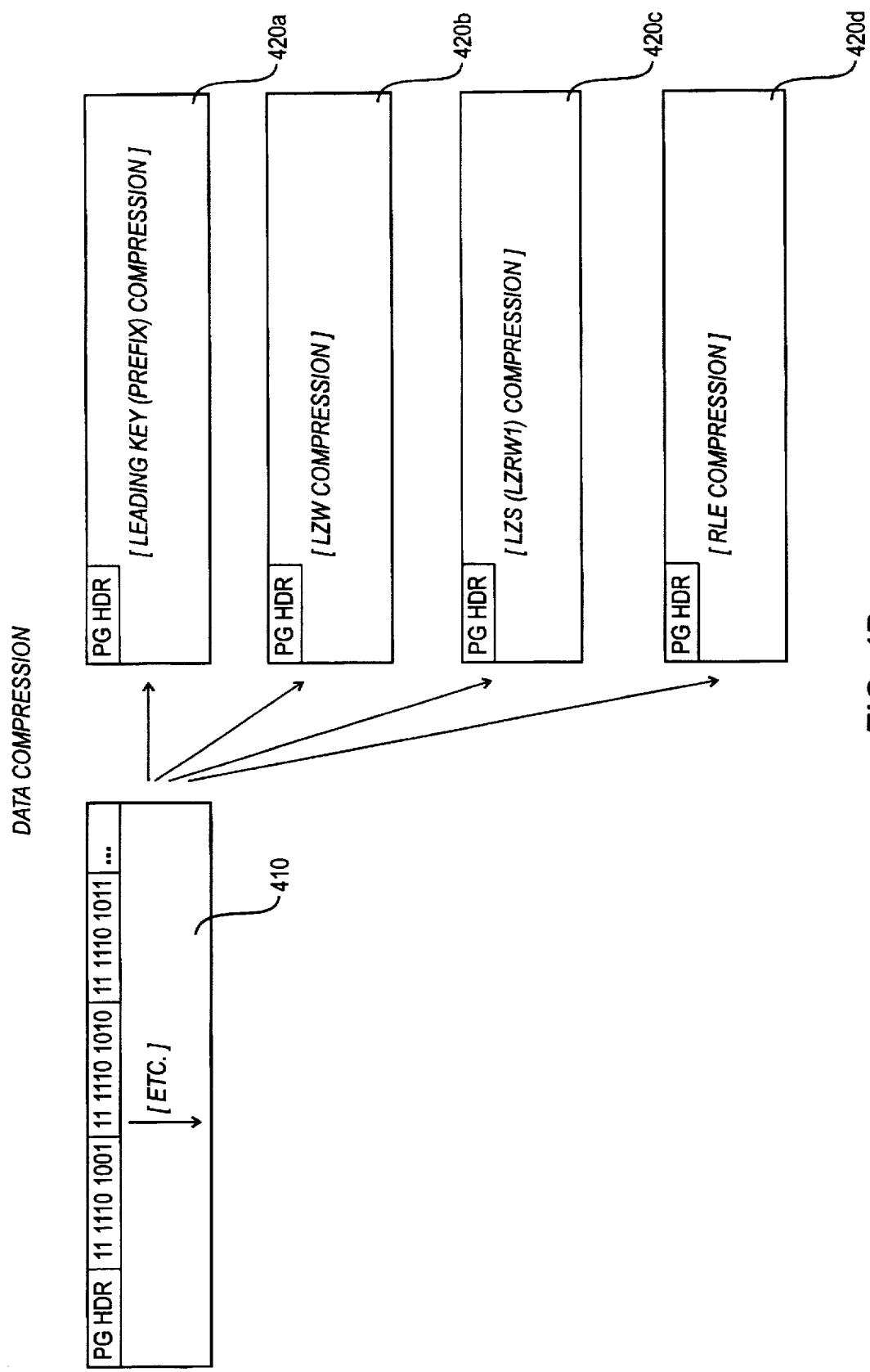

As shown in FIG. 4B, the data which has undergone a first-level compression (i.e., natural data reduction) can now undergo a second-level compression, using known compression methodology. As shown in FIG. 4B, for instance, the data page 410 may undergo further compression to a data page 420a with leading key (prefix) compression, a data page 420b with LZW compression, a data page 420c with LZS (LZRW1) compression, and/or a data page 420d with Run-Length Encoding (RLE) compression. When the particular data page is restored from disk (i.e., loaded by a Buffer Manager into memory), the respective decompression methodology would be employed, followed by restoring the unused bits (in the event that natural data reduction compression is also employed).

Figure 4C:
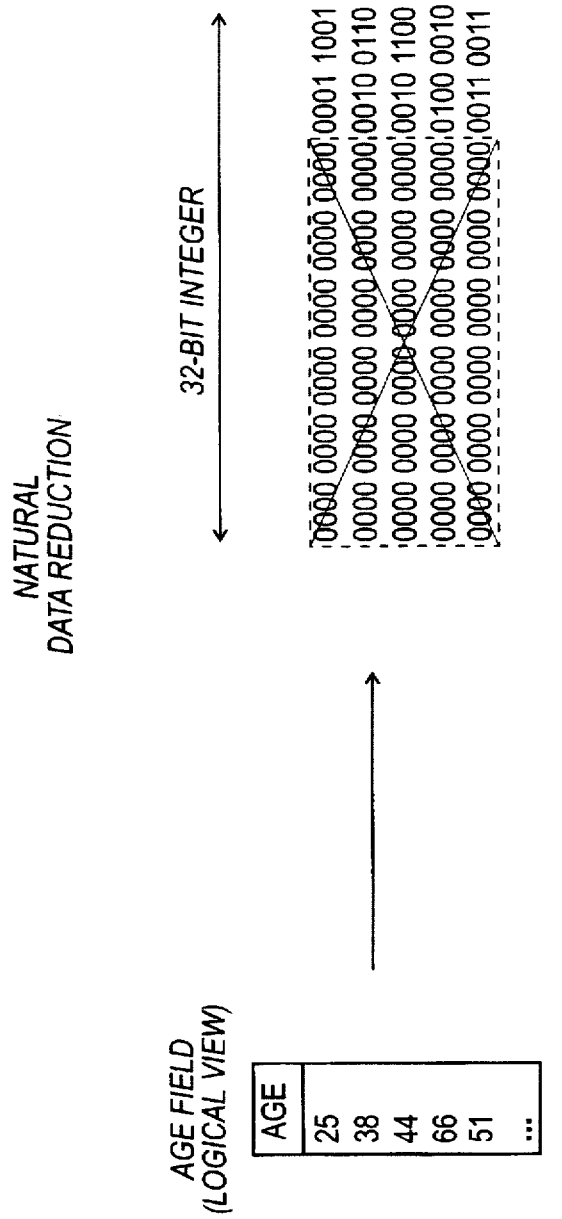

FIG. 4C illustrates that other columns of the table 300 are suitable for natural data reduction. For the Age field or column, for instance, only the lower 7 or 8 bits of a 32-bit integer would be employed, as customers are generally under the age of 128 (and certainly under the age of 256).

Figure 4D:
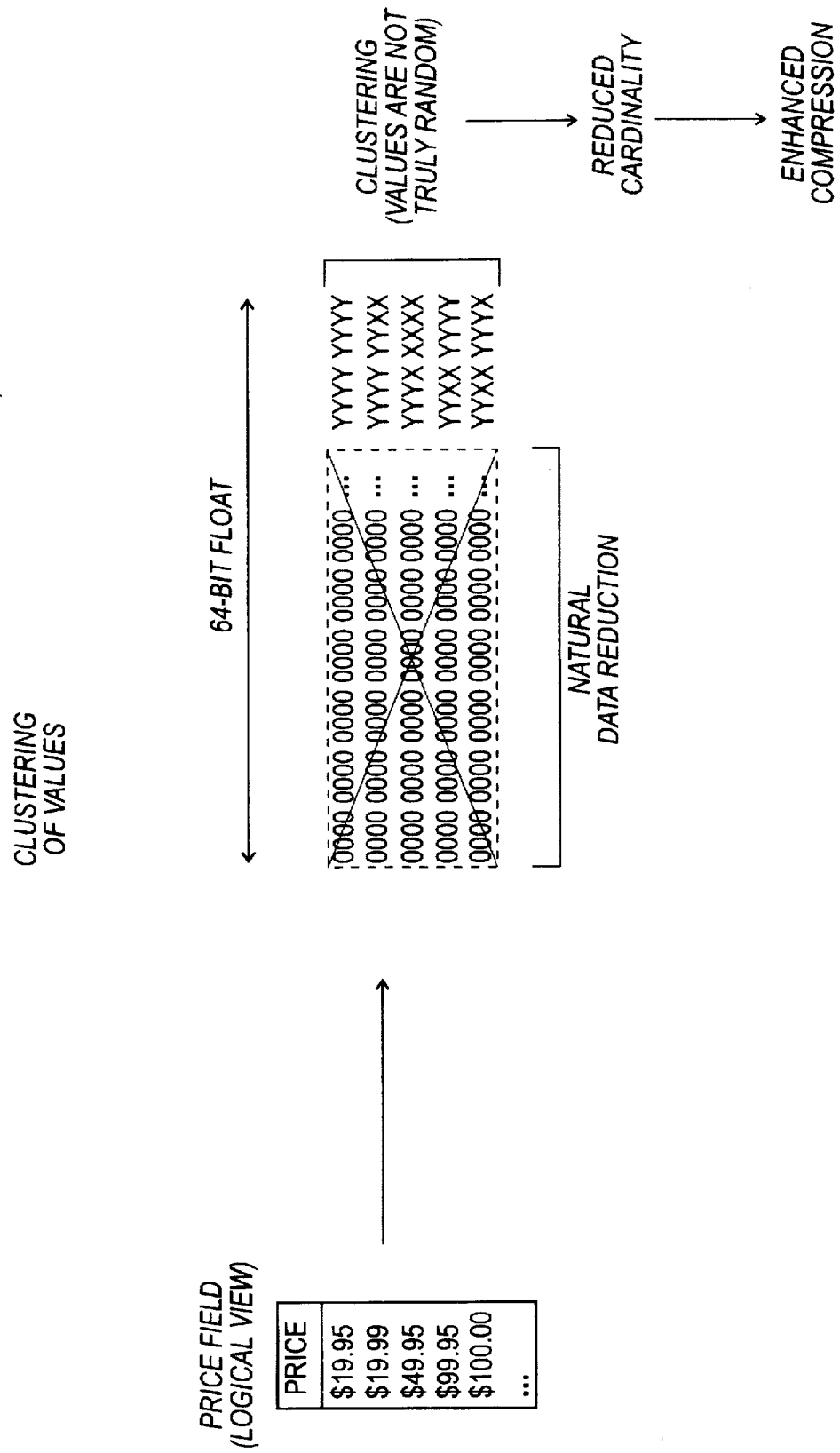

FIG. 4D illustrates that, in addition to natural data reduction of unused bits, further data reduction can be realized by the clustering of values for the data values of a particular column. Consider the data values for a Price column or field, for instance. Here, the values are not entirely random. It would be unlikely, for example, to have a price of $34.23. Instead, values tend to cluster around certain points, such as $99.95, $99.99, $100.00. As a result, the bits employed for representing a domain of values can be reduced. Moreover, this clustering brought on by vertical storage serves to "pre-condition" the data for enhancing the compression realized by conventional methodology. In particular, vertical storage enhances the ability of conventional compression methodology to reduce redundancies in data, thus leading to enhanced compression.

Figure 5:
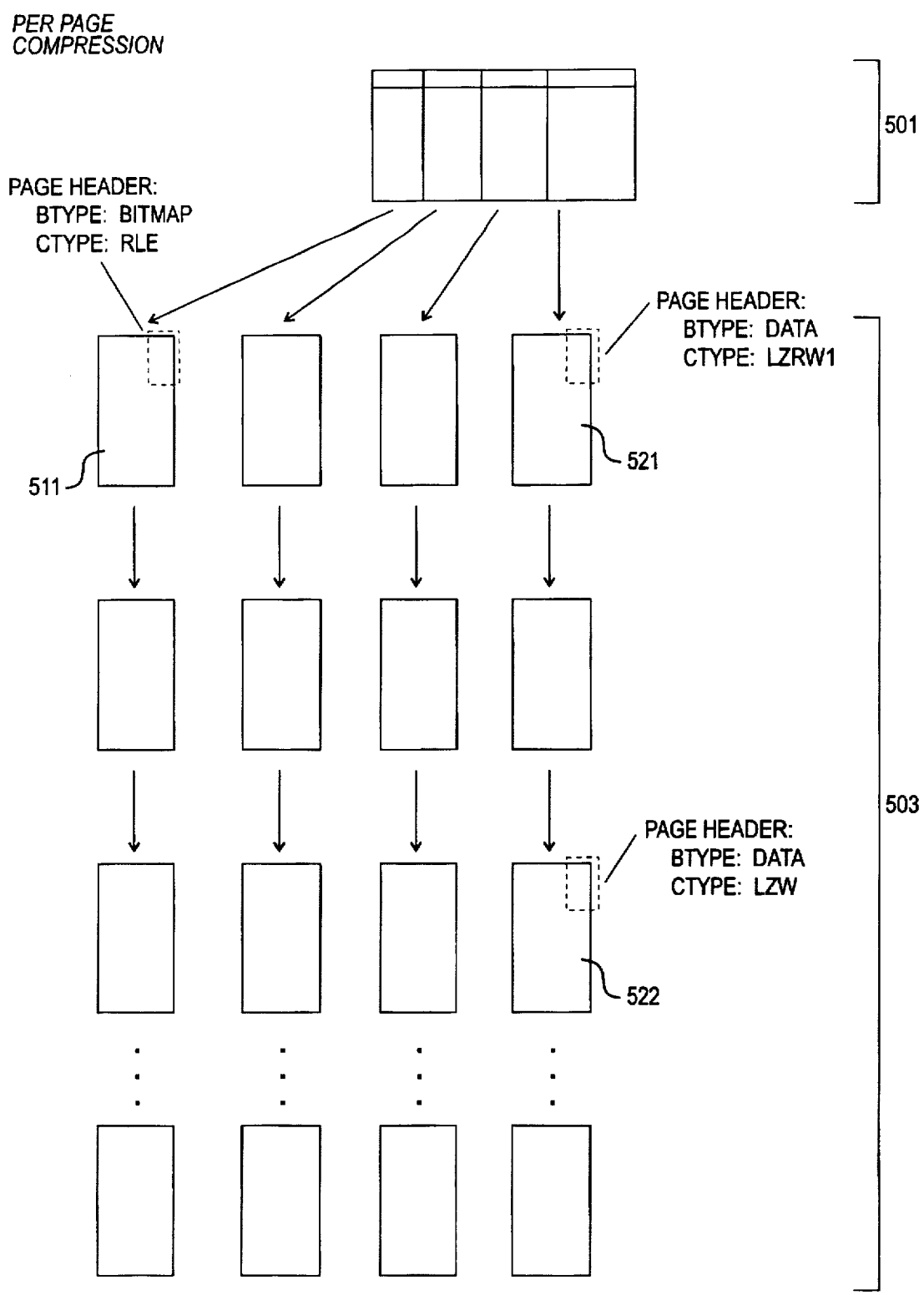
FIG. 5 is a diagram illustrating per page compression methodology of the present invention, which allows different compression methodology to be applied to different data pages (of either different page chains or even within the same page chain).

FIG. 5 illustrates that, in a preferred embodiment, compression is applied on a per page basis. Consider, for instance, table (view) 501, which includes four columns. In accordance with the present invention, the table is stored as a plurality of vertical page chains 503, as shown. Here, compression is provided on a per page basis, with the particular compression type for a given page being indicated by a CType data member in each page header. The actual page type for each page is indicated by the BType data member, which is also stored in the page header. For the page 511, for instance, the page type is bit map (BType=bit map) and the compression type is Run-Length Encoding (CType=RLE). For page 521, on the other hand, page type is data (e.g., alphanumeric user data) and compression type is LZRW1. Within the very same vertical page chain, however, compression type can be changed, since it is provided on a per page basis. Thus as shown by page 522, compression type is switched to LZW.

3. Logical tables

Traditional database systems maintain a system catalog for keeping track of tables, at a physical level (i.e., physical tables). For a particular table, such a system can find from the catalog a chain of pages (i.e., physical chain of pages) which represent that table. The system of the present invention adopts a similar approach, but with an important difference. In the system of the present invention, from an SQL system catalog, the system can determine a chain of columns which represent a particular table. From the chain of columns, it can locate the chain of pages for those columns. Effectively, through the same conventional mechanism as employed for tracking a traditional table, the system of the present invention is also able to track its tables, but with the important difference that the catalog is organized to optimize for DSS (i.e., by implementing vertical partitioning). Thus at a core level—at the level of the system catalog—the organization is changed to emphasize the notion of columns, instead of tables. Here, the concept of a "table" in the system of the present invention is purely a catalog logical entry, as opposed to a physical entity in which it traditionally exists. The columns are "tied together" logically to represent a table.

Each cell within a column (i.e., column value for a record) is arranged on a data page in a contiguous fashion. For fixed-length fields (e.g., two character State field), the offset of any particular cell on a page can be quickly computed as a modulus of that cell (adjusted for any header information to the page). Between the individual cells, there is no overhead information, in contrast to several row-based implementations. Since the cells, in essence, exist as a solid stream of data, column scans are particularly efficient.

The pages are optimized for compression by storing in the page header a status flag indicating whether the data page is a candidate for compression and (optionally) what type of compression is best suited for the data on that page. Since this is settable on a page-by-page basis, one particular compression technique can be applied on one column yet at the same time another compression technique applied on another column, all within the same (logical) table.

In addition to sequentially scanning the pages, the system also allows random access. In particular, a B-Tree data structure is maintained; the key stored in the B-Tree is the logical page number (e.g., block 1, block 2, and so forth and so on). The logical block number translates into a physical page number. For a page chain comprising 4 million pages, therefore, the system can access a particular page (e.g., the 1 millionth page) without having to scan all pages. This is useful for supporting more traditional, "needle-in-a-haystack" queries.

The column-wise approach to storing table information improves ALTER table operations, such as for adding or deleting columns. In a traditional system, the task of adding or deleting columns is quite expensive, as this requires the system to touch every row of every data page, for removing or adding the particular row. In the system of the present invention, in contrast, a column is added simply as a new entry is added to the system catalog. In a similar fashion, a column is dropped by updating the system catalog and, additionally, deleting the data pages for that particular row. With vertical partitioning, therefore, table ALTER operations change from being very slow to being very quick. This is particularly important in the context of DSS applications as data warehouse data typically has tables of numerous columns of historical data and, hence, tends to undergo much more schema changes over time.

4. Buffer Manager modified to provide native data compression

Data compression is added to the system at the level of the Cache or Buffer Managers. It is preferable to isolate compression here so that each object need not be concerned about compressing itself (or even being aware that compression is occurring). As a result, compression is transparently added to all data objects managed by Buffer Managers. The data pages of an object are compressed when sent out to disk and decompressed when retrieved from disk, yet the object itself is unaware of this action.

Most objects within the system, such as tables, indexes, logs, and the like, exist as pages. As these objects are streamed to disk, each simply requests its Buffer Manager to store the object on disk. The Manager in turn stores the object on disk using the best compression methodology known to it, for the given object. In this manner, data compression is transparent to the data objects above the level of the Buffer Manager.

Actual compression methodology can be provided using commercially available compression/decompression libraries. In a preferred embodiment, the methodology employed is LZS221 (available from Stac Electronics of San Diego, Calif.), which is described in U.S. Pat. Nos. 4,701,745, 5,016,009, 5,126,739, and 5,146,221. LZRW1, a similar methodology, can be employed. See Williams, Ross, *An Extremely Fast Data Compression Algorithm*, Proceedings from IEEE Computer Society Data Compression Conference, Snowbird, Utah, April 1991; additional material available from Internet FTP site FTP.adelaide.edu.au ("compression" subdirectory). Alternatively, LZW compression/decompression, which is described in U.S. Pat. No. 4,558,302, may be employed; or PKZIP compression/decompression (available from PKWare of Brown Deer, Wis.), which is described in U.S. Pat. No. 5,051,745, may be employed. The disclosures of each of the foregoing are hereby incorporated by reference.

With column-formatted storage, as taught by the present invention, data is preferably compressed/decompress using the LZS (or related LZRW1) methodology. The LZS approach exhibits good compression/decompression throughput. More particularly, better-than average decompression times are realized with column-formatted data storage, as indicated by the following benchmarks.

TABLE 1

|  | LZW | LZRW1 | RLE | GZIP1 | GZIP3 | GZIP6 | PKZIP |
|---|---|---|---|---|---|---|---|
| _BArrayCompressedLength (MB) | 395 | 488 | 481 | 410 | 402 | 385 | 427 |
| _BArrayCompressTime (s.) | 1741 | 236 | 564 | 1982 | 2617 | 5973 | 11631 |
| _BArrayDataLength (MB) | 969 | 1055 | 588 | 1158 | 1158 | 1158 | 1110 |
| _BArrayDecompressTime (s.) | 597 | 157 | 75 | 481 | 444 | 411 | 1812 |
| Compression speed (KB/s) | 557 | 4343 | 1043 | 585 | 442 | 194 | 95 |
| Decompression speed (KB/s) | 1623 | 6720 | 7840 | 2407 | 2608 | 2818 | 613 |
| _BMLeafCompressedLength (MB) | 59 | 78 | 44 | 139 | 140 | 137 | 57 |
| _BMLeafCompressTime (s.) | 300 | 40 | 62 | 518 | 644 | 1185 | 1746 |
| _BMLeafDataLength (MB) | 188 | 188 | 150 | 284 | 284 | 284 | 194 |
| _BMLeafDecompressTime (s.) | 115 | 28 | 17 | 100 | 98 | 96 | 251 |
| _BMSegCompressedLength (MB) | 0.6 | 6.6 | 0.07 | 0.3 | 0.3 | 0.1 | 0.4 |
| _BMsegCompressTime (s.) | 63 | 5 | 2 | 27 | 24 | 53 | 55 |
| _BMSegDataLength (MB) | 50 | 50 | 50 | 50 | 50 | 50 | 50 |
| _BMSegDecompressTime (s.) | 27 | 6 | 5 | 3 | 4 | 6 | 11 |

TABLE 1-continued

| | | | | | | | |
|---|---|---|---|---|---|---|---|
| _BTreeCompressedLength (MB) | 31 | 35 | 0.9 | 20 | 22 | 20 | 23 |
| _BTreeCompressTime (s.) | 153 | 17 | 1.4 | 117 | 178 | 523 | 2266 |
| _BTreeDataLength (MB) | 86 | 86 | 8.7 | 86 | 86 | 86 | 86 |
| _BTreeDecompressTime (s.) | 55 | 15 | 0.7 | 31 | 29 | 28 | 105 |

| Full TPC-D database | LZW | LZRW1 | |
|---|---|---|---|
| Compress | 1:18:51 | 54:58 | |
| Blocks | 121302 | 120452 | |
| Decompress | 4:47 | 2:52 | (2 columns of lineitem table) |

Decompression time is particularly important in DSS environments as there are usually more readers than writers.

Internal operation

A. Buffer Manager

1. Overview of s_bufman and s_buf

The construction and internal operation of the present invention is perhaps best understood by examining the C++ objects/classes which provide the functionality necessary for implementing the above-described improved Decision Support query performance. Central to operation of the system of the present invention is an improved Cache or Buffer Manager, which in the system of the present invention is implemented as a plurality of Buffer Managers, each comprising a Buffer Manager and one or more buffers. A first object, created from a s_bufman C++ class, is an object which serves as the Cache or Buffer Manager proper. In a preferred embodiment, multiple instances of s_bufman objects can be created. Each is a complete Buffer Manager in its own right.

When an object instance of class s_bufman is created, the object receives a list of one or more files for which it is to manage a cache buffer for. The files themselves may include logical files (e.g., UNIX files), raw partitions, or the like. The s_bufman object functions both as a Buffer Manager and as an interface to a page allocator (i.e., interface to disk storage).

When starting with a completely empty database, an object of type s_bufman is instantiated by the system by invoking a "Create" method of the s_bufman object, s_bufman::Create. This call, in turn, returns a pointer to an object of class s_buf—a buffer or cache. An s_bufman object contains or controls a cache of s_buf. During operation, in other words, s_bufman includes a Create method which creates an instance of s_buf, a buffer in memory. Two parameters are specified at creation of an s_buf cache object: the physical block size (i.e., the minimum size of a physical I/O operation) and how many physical blocks equal a "page." The former indicates how big the page size is. In an exemplary embodiment, page sizes are multiples of the physical block size (that the Buffer Manager has been told that it can use); in an exemplary embodiment, the default size is 4K. The default size for a page, in turn, is 16 blocks. The page size is, therefore, 64K (i.e., 16 times 4K). Although the system can create buffers of different page sizes, preferably all have the same fundamental block size which each is based on.

When a buffer is created in memory, it is not necessarily streamed out to disk. Therefore, when the Create method is called, the system does not at that point find a physical location on disk to store the object. Only upon occurrence of an explicit write call (e.g., when "paging out") does the system invoke the page allocator for putting the information in one of the files which the object serves as the Buffer Manager for. The Manager automatically determines when the object is stored to disk. When written to disk, if the object has not been allocated a slot on disk (i.e., a physical address or page number on disk), the Manager will (in conjunction with a page manager) allocate one.

The only way a user or client can get a buffer is through the Create (or Find) method described below. The Create method returns an s_buf pointer, in essence giving the user or client access to a buffer which is in memory. The buffer is returned pinned or locked (so that the pointer remains valid). The Create and Find calls automatically perform the task of pinning or locking the buffer in memory. Later, when the buffer is freed, it will be unlocked or unpinned. For this purpose, the s_buf class includes an unlock method.

To actually find something in the buffer, a Find method of the Buffer Manager is invoked. Specifically, the system invokes an s_bufman::Find method, passing it a page number or ID for the page being sought. One of two things can happen, a cache "hit" or cache "miss" occurs. Internally, the Find method looks at its own cache to determine whether a cache hit or miss occurs. From its own hash table, the Buffer Manager (s_bufman) can determine cache hit or miss based on the page number. In the instance of a cache miss, for example, the Buffer Manager finds no entry in its own internal hash table for the sought-after page; accordingly, it does not have the item in cache. The manager must go to disk to "grab" or read the page.

The actual call to read a page when a miss occurs invokes s_buf::Read, an internal routine or method of s_buf. It is at this subroutine that the system invokes additional subroutines for decompressing the sought-after page. Actual implementation of compression and decompression is performed by a separate module which includes Compress and Decompress methods.

In a preferred embodiment, the compressed version of the page is retrieved into a separate buffer (i.e., separate from s_buf). The system then decompresses the sought-after page from the separate buffer into the s_buf buffer. The reason for using the two-buffer approach for decompression is as follows. In a preferred embodiment, a "pre-imaging" strategy is employed for pre-imaging things which are already compressed. If a client does a "read" operation followed by a "dirty" soon thereafter, the system need not recompress that particular page. The system maintains a cache of the most recently compressed version. When the system pre-images the page for transaction image processing, the system need not perform the I/O operation again (i.e., of the original, compressed data), nor need it decompress the compressed data.

In the preferred embodiment, a "dirty" mechanism is called before a change is made. This is perhaps best explained by examining the update path—how things are written out—in the system. In the instance of a cache hit, the task of the Buffer Manager is simple. In a cache hit for a Find operation, the Buffer Manager does a hash to the page, which is resident in the buffer in an uncompressed form. The Buffer Manager can, therefore, return an s_buf pointer to that page. Although a user (client) of the Buffer Manager can "read" particular pages, the Buffer Manager does not surface a "Write" method to its users. Instead, the Buffer Manager assumes responsibility for writing out pages at appropriate times. For instance, when insufficient room exists in the cache (e.g., when bringing in a new page), the Buffer Manager will "paged out" pages automatically, according to a Least-Recently Used (LRU) or other aging scheme. Additionally, at "commit" time (i.e., when a transaction commits), the Buffer Manager schedules all the writes which have not been performed yet. In essence, therefore, the user simply modifies (i.e., "dirties") pages, and the Buffer Manager assumes responsibility for the actual task of writing pages to disk. In this manner, the Buffer Manager provides automatic writing of pages, without publishing a "Write" method to its users. By specifying a "commit," however, a client or user can inform the Buffer Manager that the buffer has been changed and that the user is done. In essence, this informs the Buffer Manager that it can now flush the buffer (e.g., in preparation for the next transaction).

In the case where the user desires to change data, it obtains an s_buf pointer, by invoking the Create or Find methods. The user data itself resides in the buffer. Before the user actually modifies that data, it first invokes a Dirty method. From the s_buf object, the user receives a pointer to a space which it is allowed to modify (usually a subset of a 64K space). By invoking s_buf::Dirty, the user can gain the privilege to modify the data. The Dirty method performs the "pre-imaging"—creating a before image (i.e., compressed version, before change), for crash recovery. Additionally, the Dirty method toggles a flag in the s_buf buffer, for indicating that the buffer is now "dirty"; therefore, if it is "paged out," it needs to be written. When pre-imaging, the system looks for a hit in the cache of already compressed pages. If one is not found (i.e., "miss"), then the system will perform the necessary I/O operation to get the compressed version (and cache it as a pre-image).

Actual writing of a buffer is done at the level of s_buf, with each buffer (i.e., s_buf object) including an internal Write method for writing itself out, the class method s_buf::Write. This method is invoked for "flush," "commit," and "page out" operations. Like the Read method, the Write method invokes subroutine calls to the low-level compression routines or methods.

After the system is done with a buffer, it calls a Destroy method. In a preferred embodiment, more than one version of the Destroy method is provided. In a first method of Destroy, a s_bufman::Destroy method can be invoked with the s_buf pointer. This method frees up the buffer and gives back the page which that buffer belongs to, to the page allocator or manager (i.e., free list manager). In the second version of the destroy method, a page ID or number is passed. This version otherwise performs the same functionality as the first version.

2. Detailed construction and operation of s_bufman a. Class definition

In an exemplary embodiment, the s_bufman class may be constructed as follows (using the C++ programming language).

```
1:  /****************************************************************
2:      s_bufman -- the main interface to the outside world
3:  ****************************************************************/
4:
5:  class s_bufman : public hos_error, public s_bufman_stats
6:  {
7:
8:  friend class s_buf;
9:  friend class s_bufcache ;
10: friend class s_blockmap ;
11: friend class s_blockmap_identity ;
12: friend class s_bufpool_ts ;
13:
14: // . . .
15:
16: public:            // s_bufman interface
17:
18:     s_bufman(hos_int maxbuffers, hos_int blocksize,
19:         hos_boolean rwaccess, hos_memloc in_shrmem=HOS_PRVMEM);
20:     ~s_bufman( );
21:     s_bufman(s_bufman &);
22:
23: // . . .
24:
25:     s_buf*      Create(hos_bio*, s_btype, hos_int nBlks,
26:                     hos_cmprstype = HOS_CMPRST_ANY) ;
27:     s_buf*      Create(s_blockmap*, hos_bio*, s_btype,
28:                     hos_cmprstype = HOS_CMPRST_ANY);
29:     s_blockmap* CreateBlockMap(hos_bio*, s_blockmap_identity&,
30:                     hos_int minBlocks,
31:                     hos_int chunkSize, hos_int maxSlots) ;
32:
33:     void    Destroy(hos_bio *biop, hos_uint block, s_btype btype,
34:                     hos_int nBlks) ;
35:     void    Destroy(s_bufPtr& sb);
36:     void    Destroy(s_buf *sb);   // use only for a member variable
```

```
 37:
 38:        s_buf*    Find(hos_bio*, hos_uint block, s_btype btype,
 39:                        hos_int nLogicalBlks) ;
 40:        s_blockmap* FindBlockMap(hos_bio*, const s_blockmap_identity&,
 41:                        hos_boolean RWAccess) ;
 42:
 43:        // Write all dirty buffers.
 44:        void      Flush(hos_boolean unlockedOnly = HOS_FALSE);
 45:
 46:        hos_boolean FreeUpMemorySpace( );
 47:        hos_boolean FreeUpDiskSpace(hos_bio* requestingBio,
 48:                        hos_int nBLocks);
 49:        void      PrepareToRelease( ) ;
 50:        void      Release(hos_boolean force,
 51:                        hos_boolean finalCommitRelease = HOS_FALSE) ;
 52:
 53: private:
 54:        // . . .
 55:        void      DeleteBlockMap(s_blockmap*, hos_mutexCatchLock*,
 56:                        hos_mutexCatchLock* = 0) ;
 57:        void   Destroy(s_blockmap*,hos_bio*,hos_uint block,s_btype) ;
 58:        s_buf*    Find(s_blockmap*, hos_bio*,
 59:                        hos_uint logicalBlockId, s_btype);
 60:        void      FindAndDestroy(hos_bio*, hos_uint physicalBlockId,
 61:                        s_btype, hos_int nLogicalBlocks);
 62:        void      FindAndDestroy(s_blockmap*, hos_bio*,
 63:                        hos_uint logicalBlockId, s_btype) ;
 64:        // . . .
 65:
 66:
 67: // --------------------
 68:
 69:        static const hos_cmprstype
 70:            _btypeSpecificCompressions  [NUMBER_S_BTYPES] ;
 71:        hos_int       _blocksize;    // The blocksize of all blocks in
 72:                                     //    the buffer pool.
 73:        hos_boolean   _throwing ;    // True if throwing and bufman
 74:                                     //    is in inconsistent state
 75:                                     // Set/checked by mutex lock objects
 76:        hos_boolean   _allowQuickDrop ;  // True if allowing quick drop
 77:
 78:        hos_boolean   _rwaccess;         // Access HOS_TRUE for ReadWrite
 79:                                         // HOS_FALSE for ReadOnly.
 80:        hos_int       _flags ;           // S_BUFMAN_XXX flags . . .
 81:        hos_int       _maxbuffers;       // Slots in buffer table.
 82:        hos_int       _nBuffersInUse;    // Current number of slots in use.
 83:
 84:        // _nBuffersLocked subject to mutex (non-HPRODUCTION systems)
 85:        hos_mutex     _BuffersLockedMutex ; // controls _nBuffersLocked
 86:        hos_int       _nBuffersLocked; // Current number of slots in use.
 87:        hos_uint      _tbuffers;       // Total number of slots ever used.
 88:
 89:        // Use of _blockmapBufman doesn't require the
 90:        // following mutex, but instantiation does.
 91:        hos_mutex     _blockmapBufmanMutex;  // mutex for instantiation
 92:                                             //    of blockmapBufman
 93:
 94:        s_bufman*     _blockmapBufman;       // a bufman for blockmaps
 95:
 96:        // The following pair of ivars must be manipulated as a unit
 97:        s_hashtb*     _hashtable;            // Hashtable to index buffers.
 98:        hos_mutex     _hashtableMutex;       // for locking '_hashtable'
 99:
100:        // The following pair of ivars must be manipulated as a unit
101:        s_hashtb*     _blockmaps ;           // blockmaps owned by bufman
102:        hos_mutex     _blockmapsMutex;       // for locking '_blockmaps'
103:
104:        s_bufpool_ts  _bufpool ;     // Owns/manages. s_buf s in LRU chains
105:        s_bufcache    _compressedBufferCache;  // cache results of Read( )
106:
107:        hos_memloc    _inShrmem ;            // in shared memory
108: };
```

(line numbers added for convenience of description)

As shown, the s_bufman class is derived from two classes: hos_error and s_bufman_state. The hos_error class provides C++-like exception handling; since some C++ compiler implementations do not provide this functionality yet, the exception handling is provided at the source code level. The second parent class s_bufman_state, provides a base class for the Buffer Manager, which includes general state information (which is not necessary for understanding the present invention). The class definition itself begins with several "friend" class declarations. These are included for performance reasons, so that data members of friend classes can be accessed without employing "wrapper" methods.

At line 18, the class definition includes the first public constructor. It is invoked with four parameters. The first parameter, maxbuffiers, specifies the maximum number of buffers for the Buffer Manager being created. This is usually a number on the order of thousands or tens of thousands. The second parameter, blocksize, specifies the block size for each buffer. The third parameter, rwaccess, specifies read/write access privileges for the buffers. Since the system supports read-only buffers, the parameters serve as a flag for indicating to the Buffer Manager whether the buffers are read-only buffers or read/write buffers. The last parameter, in_shrmem, is a flag indicating whether the Buffer Manager is a shared memory Buffer Manager. For a shared memory Buffer Manager, memory allocation operations occur out of shared memory.

Complementing the constructors, the class definition includes an s_bufman destructor, at line 20. The destructor, which performs cleanup, can be implemented in a conventional manner. A final constructor—a copy constructor—is defined, at line 21. The copy constructor simply performs "copy construction"—a well-known C++ technique of creating a copy of an object. This may be implemented using conventional C++ techniques.

At line 25, the class definition defines the Create method. At line 27, a second Create method is defined, using C++ overloading features. The two Create methods are essentially identical, except that the latter version employs a "block map." To understand this difference, therefore, it is necessary to describe what a "block map" is. One of the problems in doing compression is that a modified block may no longer compress back down to its original size. Consider a Create operation which yields a 64K buffer. Suppose that the first time the 64K buffer is paged out it compresses down to one 4K block. Here, the page allocator or manager allocates one block (on disk) for storing the block which is being paged out. Suppose, at a later point in time, that the block is brought back in and modified in such a way that it will no longer compress down to one block. The problem which arises, therefore, is that the page must now be relocated, as it no longer fits in its then-existing slot (which has members to the left and to the right). For hierarchical data objects (e.g., B-Tree), it is likely that other members (i.e., ones which store pointers to the block) may also need to be notified of the relocation.

To address the foregoing problem, therefore, a block map is employed in the system of the present invention. Within a Buffer Manager, there can be as many instances of a block map as needed. Typically, one exists per object or portion thereof. For instance, one block map can exist per B-Tree, or one per portion of a B-Tree (e.g., non-leaf level pages). Each block map, in turn, may be thought of as a logical-to-physical translator for the object (or subobject) which is its focus. In this manner, the system can concentrate on bringing in the object (or portion of the object) which is needed. From a call to the Create method, a user or client may get back a particular page number, such as page #1. This page number is a logical page number which serves as an index into the corresponding block map for determining the actual physical page number. For implementations without compression, this translator may be eliminated.

Returning to the description of the two Create methods, each takes a hos_bio pointer parameter, which indicates the particular file which this buffer is being established for. The second Create method also takes the just-described block map, for performing translation in the case of systems which employ compression. The first version is employed, therefore, when the logical-to-physical translation is not required (e.g., for data objects which do not have a hierarchical relation, or when compression is turned off). Since the block map does create an extra level of indirection when doing page mapping and page out operations, it is preferably avoided, when possible. For this reason, the s_bufman class definition includes the two versions of the Create method.

The other two parameters to the Create method include nBlks and hos_cmprstype. The former indicates how many physical database blocks make a page, for the buffer being created. The former parameter specifies the default compression type for the buffer. As shown, the default compression type is "any"—the system picks the compression type. However, the client is given the ability to override this type, by simply specifying the type when invoking the Create method. This is useful in instances where the client has better knowledge of which compression type to employ.

The second Create method also includes an s_b type parameter. This serves as a flag for indicating what page type the buffer is employed for. For example, page types may include B-Tree, bit map, and the like. This allows the system to perform additional error checking. In the header of each page on disk, a page type data member (byte) is stored, for indicating a particular page type. This may be employed, for instance, during a Find operation for making sure that the page type found is that which is expected.

Next, the s_bufman class definition defines a CreateBlockMap method. This method simply creates a block map, whose functionality has just been described. The translation from logical-to-physical may be performed using conventional virtual memory management techniques.

Lines 33-36 define Destroy methods. Effectively, each Destroy method performs the same functionality: freeing up memory allocated for a buffer and, if corresponding space is allocated on disk, giving it back to the free list or page manager. The parameters for the Destroy method at line 33 correspond to those previously described for the Create methods.

At line 38, the s_bufman class defines the Find method. The Find method takes as its first parameter a hos_bio pointer, which is a pointer to the file which it is desired to "find" a block in. Here, a hos_bio file is a logical file. In an exemplary embodiment, as previously described, two versions of files exist. In a first version, a file can be a single file. Alternatively, a file can be a plurality of files simply treated as a single logical file. Here, "bio" stands for block input/output—a system which reads objects in increments of block size.

The Find method is followed by a FindBlockMap method; it returns the location of where the block map begins for the particular object of the s_bufman class. Next, the Flush method is defined. It simply schedules all dirty buffers to be written to disk, as previously mentioned. This is followed by other housekeeping class methods, including FreeUpMemorySpace, Free UpDiskSpace, and Release.

The next section of the class definition is the private declarations. Generally, the private method or routines include corresponding versions of the public methods. These methods are called by respective public methods, but the private routines do not take out locks. This is done to decrease contention for locks, particularly since the methods can be invoked internally (i.e., with the class). In other words, the public methods largely serve as wrappers to the private methods. In operation, therefore, the public methods take out appropriate locks and call onto the private methods.

The private methods may be called internally when the object knows that it already has secured the corresponding lock. The remaining private methods are internal housekeeping routines and are not considered relevant to the invention herein.

Lines 67–107 of the class definition set forth data member declarations. Line 69 declares an array of type hos__cmprstype, which serves for statistics monitoring. The next data member, __blocksize, stores the block size of all blocks in the buffer, at line 71. The __throwing data member, at line 73, is a flag indicating if the object is currently "throwing" an exception (i.e., the s__bufman is in an inconsistent state). The __allowQuickDrop data member, at line 76, serves as a flag indicating whether "quick drop" (i.e., no logging) is allowed. The __rwaccess data member, at line 78, serves as a boolean indicating whether access is read/write or read-only. The __flags data member stores housekeeping flags. The __maxbuffers data member stores the number of slots in the buffer table; this number is passed in as a constructor argument. The __nBuffersinUse data member, at line 82, stores the current number of slots in use.

The __nBuffersLockedMutex, at line 85, controls the current number of slots which are locked—in use. The number of locked buffers is stored by __nBuffersLocked, at line 86. The total number of slots ever used is stored by the __tbuffers data member, at line 87. This is for statistics monitoring, indicating the maximum number of slots ever used. At line 91, the class declares a __blockmapBufmanMutex, for mutex (MUTually EXclusive) locking. Use of a mutex for multithreaded synchronization is know in the art. In a preferred embodiment, the block map includes its own s__bufman Buffer Manager (i.e., a bufman within a bufman). Accordingly, it employs its own buffer pool. Therefore, at line 94, a bufman for block maps is declared, __blockmapBufman.

At line 97, the class declares a hash table to index buffers, __hashtable. In an exemplary embodiment, as previously described, the system performs a hash on the page number. At line 98, the class declares a __hashtableMutex data member for mutex (MUTually EXclusive) locking the hash table (e.g., for reading and writing entries to the table). In a corresponding manner, a hash table is declared for block maps at line 101, and a mutex is declared for locking the block map hash table at line 102.

Completing the class definition, the __bufpool data member, at line 104, manages the LRU (Least-Recently Used) chain, which guides buffer page reuse. The __compressedBufferCache data member, at line 105, is the compressed pre-image buffer cache —that is, it caches the results of the read operation. All reads are performed into this buffer, from which the data can be decompressed into the corresponding s__buf buffer. Finally, at line 107, the __inShrmem data member serves as a flag indicating whether the s__bufman object is in shared memory.

b. Exemplary class methods (1) Create

In an exemplary embodiment, the Create method can be constructed as follows (using the C++ programming language).

```
1:   s_buf *s_bufman::Create(hos_bio *biop,
2:       s_btype btype, hos_int nBlks, hos_cmprstype ctype)
3:   {                                    // Create
4:       s_buf*      slot;
5:       hos_uint blknu;
6:
7:       hos_mutexCatchLock    sbufMutexLock(_throwing) ;
8:       // no mutex, set in bowels of bufman
9:
10:      // . . .
11:      validbio(biop);
12:      MustHaveRWAccess( );
13:
14:      // Modify the compression type if the argument is ambiguous
15:      // and we have a more specific choice for passed block type
16:      if (hos_compress::CompressionTypeIsAmbiguous(ctype))
17:          if (_btypeSpecificCompressions[btype] != HOS_CMPRST_ANY)
18:              ctype = _btypeSpecificCompressions[btype] ;
19:
20:      // Allocate block
21:      if (blknu = biop->Allocate(nBlks,HOS_FALSE))
22:          {                            // got blocks in one chunk
23:          // Get a mutex locked s_buf
24:          slot = GetBufferSlot(sbufMutexLock, HOS_FALSE);
25:          // hashtb not locked
26:
27:          if (!slot)
28:              {
29:              // All buffers are in-use
30:              S_BUFMAN_THROWBUF1(BUFMAN_ALLSLOTSLOCKED, slot,
31:                  _maxbuffers);
32:              }
33:          // init, grab memory buffer
34:          slot->Prepare(biop, blknu, btype, nBlks, ctype, 0);
35:          if (_lastBlock < blknu)
36:              _lastBlock = blknu;        // stats
37:          }                              // got blocks in one chunk
38:
39:      else
40:          // Chain blocks together as needed to satisfy request
```

```
41:     {                       // try allocating in smaller pieces
42:         stack_diskdescriptor newDesc ;
43:         AllocateDiskBlocks(&newDesc,biop,GetUserSize(nBlks));
44:         blknu=newDesc.GetLinkAddr(0);
45:
46:         // Get a mutex locked s_buf
47:         slot = GetBufferSlot(sbufMutexLock, HOS_FALSE);
48:         // hashtb not locked
49:
50:         if (!slot)
51:         {
52:             // All buffers are in-use
53:             S_BUFMAN_THROWBUF1(BUFMAN_ALLSLOTSLOCKED, slot,
54:                 _maxbuffers);
55:         }
56:         slot->Prepare(biop, blknu, btype, nBlks, ctype, &newDesc);
57:         s_diskblockheader* sbuf=slot->_dskBlk;
58:         sbuf->SetFirstBlockId(newDesc.GetLinkAddr(0));
59:         sbuf->SetFirstNBlocks(newDesc.GetLinkBlocks(0));
60:         sbuf->SetChainedBlockId(newDesc.GetLinkAddr(1));
61:         sbuf->SetChainedNBlocks(newDesc.GetLinkBlocks(1));
62:     }                       // try allocating in smaller pieces
63:
64:     // Allocated page and memory, ready to do work.
65:
66:     // Freshly created s_bufs are always dirty
67:     slot->DirtyInternal( );
68:
69:     // we guarantee that the buffer comes back full of zeros
70:     hos_memset(slot->GetData( ), 0, slot->GetUserSize( ));
71:
72:     // We're done diddling the slot
73:     slot->LockUserLocked( ) ;   // Set the lock on the buffer
74:     sbufMutexLock.UnLock( );    // and release the mutex
75:
76:     // If we throw now the above slot is lost, because it is
77:     // userlocked and will not be unlocked. But if we throw while
78:     // inserting into the hash table we're in big trouble
79:     // anyway and will presumably no longer be useable.
80:
81:     // Always update hashtable after s_buf::Prepare
82:     // Done outside s_buf mutex lock, since hashtable locks
83:     // must be obtained first
84:     // Note that nobody can Find( ) this buf yet since we
85:     // haven't returned it.
86:     hos_mutexCatchLock   hashtableLock(&_hashtableMutex, _throwing) ;
87:
88:     _hashtable->InsertKeyVal(slot->GetPrimaryKey( ),
89:         slot->GetSecondaryKey( ), slot) ;
90:     hashtableLock.UnLock( ) ;
91:
92:     _ncreates++;                // stats
93:     _ncBlks += nBlks;           // stats
94:     return slot;    // return ptr to s_buf to user
95: }                              // Create
```

After some initialization steps, the method validates the passed-in file pointer at line 11. At line 12, the method checks whether it has read/write access. At lines 14–18, the method picks a compression type, if the user has not already specified one. In a preferred embodiment, the compression type is actually assigned on a per-page basis. When no type is specified by the user, the system picks a default compression type (ctype) based on the page type (btype). Internally, the system maintains an array of page types. Stored together with each page type entry is a preferred compression type, thus allowing the system to easily select a preferred compression type for a given page type.

At line 21, the method allocates n number of blocks, by calling an Allocate subroutine. The subroutine returns true when the number of blocks allocated in one chunk (i.e., contiguous) equals n. Otherwise (i.e., the Allocate subroutine returns false), the method executes the else statement of line 39, to chain together blocks as needed to satisfy the allocation request. For the instance where the if statement holds true (lines 22–37), the method sets the variable slot to the hash table buffer slot which will store the entry for the allocated block. If a slot is not properly set (tested at line 27), then all buffers are in use and the method throws an exception, at line 30. In a similar manner (and after chaining together blocks), the method at the else statement (beginning at line 39) sets the slot at line 47 and throws an exception at line 53 if no slot is obtained. Here, the page number which is hashed on is stored by blknu (which is returned by the subroutine call to the allocation subroutine). This is the logical page number for the blocks. After a valid slot has been obtained, the method "prepares" (i.e., initializes) the memory buffer for the slot, at line 34 (if allocated in one chunk) or at line 56 (if allocated in multiple chunks). Upon reaching line 64, the method has allocated a page on disk, obtained a hash table slot, and allocated system memory. Note that the slot is actually an sbuf (pointer) which is eventually returned to the user.

At line 67, the method "dirties" the buffer, as newly-created buffers are always considered dirty (i.e., do not have a current version stored on disk). The call, in effect, sets the "dirty" bit for the page so that when the page is paged out of memory it is also written to disk. At line 70, the method initializes the buffer, by filling it with zeros. At line 73, the slot is "locked" (i.e., exclusive access). At this point, therefore, the method sets the lock on the buffer, as it is returned to the user locked. At line 74, the method releases the mutex (which was set during initialization). The slot is now ready for insertion into the hash table.

Insertion into the hash table is done by obtaining a lock to the hash table, at line 86. Then the slot is inserted by calling a subroutine, InsertKeyVal. The lock is then released, at line 90. At lines 92–93, the method sets statistical flags (for monitoring purposes). Finally, at line 94, the method returns the slot (s_buf pointer) to the user.

(2) Find

In an exemplary embodiment, the Find method may be constructed as follows (using the C++ programming language).

```
1:   s_buf *s_bufman::Find(hos_bio *biop, hos_uint block,
2:          s_btype btype, hos_int nBlks)
3:   {   // Find
4:      s_buf *slot;
5:      hos_boolean try_again=HOS_TRUE;
6:
7:      // Take block# and bio and build key
8:      hos_int key=_hashtable->GetHashKey(biop, block) ;
9:      // . . .
10:
11:     // error checking
12:     hos_AutoMemcheck( );
13:     if (block < 1)
14:        S_BUFMAN_THROW(BUFMAN_BADBLOCK);
15:     validbio (biop);
16:     hos_mutexCatchLock hashtableLock(&_hashtableMutex, _throwing,
17:                hos_mutexCatchLock::DONT_LOCK_NOW) ;
18:
19:  while (try_again)
20:  {
21:     try_again = HOS_FALSE;
22:     hashtableLock.Lock( ) ;
23:     slot = (s_buf*) _hashtable->FindKey(key, biop, block) ;
24:
25:     // Cache miss
26:     if (!slot)
27:        {                   // pull it in from disk
28:          // Get a mutex locked s_buf
29:          slot = GetBufferSlotLocked(sbufMutexLock,
30:                 hashtableLock, biop, block); // hashtb *IS* locked
31:          if (!slot)
32:             {
33:             // All buffers are in-use
34:             S_BUFMAN_THROWBUF1(BUFMAN_ALLSLOTSLOCKED, slot,
35:                _maxbuffers);
36:             }
37:          slot->Prepare(biop, block, btype, nBlks, HOS_CMPRST_NONE, 0) ;
38:
39:          // Always update hashtable after s_buf::Prepare
40:          slot->LockUserLocked( ) ;
41:
42:          if (!slot->Read( ))
43:             S_BUFMAN_THROWBUF(BUFMAN_BIO_UNEXPECTEDEOF, slot) ;
44:
45:          // This slot is ready for use
46:          sbufMutexLock.UnLock( );
47:        }                   // pull it in from disk
48:     // Cache hit
49:     else
50:        {   // found slot, move it to head of the queue
51:          // error checking
52:          if (slot->GetBlockMap( ))
53:             // should be using blockmap Find( ) interface
54:             hos_abort("Programming error") ;
55:
56:          sbufMutexLock.SetMutex(&slot->_mutex);
57:          //
58:          if  (!sbufMutexLock.TryLock( ))
59:             {
60:             // presumably, this is very unlikely to happen!!!
61:             hashtableLock.UnLock( ) ;
62:             try_again = HOS_TRUE;
63:             // re-loop
64:
65:             }
```

```
66:         else
67:         {
68:             hashtableLock.UnLock( ) ;  // not done until slot is locked
69:             slot->LockUserLocked( ) ;  // NOTE: slot mutex is locked
70:             sbufMutexLock.UnLock( ) ;
71:             slot->Validate(block, biop, nBlks, btype);
72:             _bufpool.MoveSlotToHeadofQueue(slot) ;
73:         }
74:     }       // found slot, move it to head of the queue
75: }
76:
77:     _nfinds++;              // stats AND algorithm semantics
78:     _nfBlks += nBlks;       // stats
79:     return slot;
80: }                           // Find
```

As previously described, the method takes four parameters. The first parameter, *biop, is a binary input/output pointer—a pointer to a logical file or group of files (presented as one object which is being cached). The second parameter, block, is the block (i.e., page number) to find. The third parameter, btype, indicates what page the method is looking for. The last parameter, nBlks, represents how many physical blocks equal one page (i.e., how big is a page the method is looking for).

After declaring local variables, at lines 4–5, the method takes the passed-in block number and bio pointer and gets the key from the hash table, by calling a GetHashKey subroutine, at line 8. This serves as a key or index into the hash table. After error checking (line 12–15), the method takes out a lock on the hash table, at line 16. At line 19, a while loop is established, for looking up the hash key. In particular, the method invokes a FindKey subroutine with the hash key, at line 23, for determining a corresponding slot (i.e., s_buf pointer). One of two possibilities arise at this point: a cache "miss" or a cache "hit." The cache "miss" case is dealt with at line 26; the cache "hit" case is dealt with at line 49. Each will be described in further detail.

The cache "miss" instance is determined when the slot variable equals 0—determined by the if statement at line 26. The if statement processes the cache miss as follows. At line 29, the method attempts to get a free slot. It will get a free slot unless all slots are in use (tested at line 31), whereupon it will throw an exception, at line 34. The method cannot get a slot when it is unable to page out other pages from the cache. Typically, the subroutine call at line 29, GetBufferSlotLocked, will secure a slot, performing any necessary page out operation. Once having secured a slot, the method can proceed to line 37 to "Prepare" (initialize) the slot. In particular at this point, the method initializes data structures in preparation for the read operation which is to occur.

Next, the method may proceed to do the actually read. Specifically, a user lock is taken out on the slot, at line 40. This is followed by the actual read, at line 42. If, for some reason, the read operation fails, an exception is thrown, at line 43. Otherwise, the slot is ready for use and the mutex lock may be lifted (line 46).

The else statement at line 49 covers the instance of a cache "hit." The condition is processed as follows. At line 52, the mapping for the slot is obtained, by calling the GetBlockMap subroutine. If an error occurs, the method aborts at line 54. Otherwise, the method proceeds to line 56, where a mutex lock is taken out on the slot. At this point, the method will wait for the slot, in the case that the slot is currently in use by another process. In particular, the mIn particular, the method tests at line 58 whether the mutex lock has been successfully obtained. If not (false at line 58), the method will release the lock on the hash table and (effectively) loop back to line 19, for re-executing the while loop. When the mutex lock is successfully obtained, the method enters the else statement, at line 66. After lock maintenance and slot validation (lines 68–71), the method updates the LRU chain, with a subroutine called to MoveSlotToHeadOfQueue, at line 72. In particular, the subroutine call moves this block to the end of the LRU chain (i.e., to the most-recently used end). Upon reaching line 77, the method has found a slot (performing any necessary disk I/O operation) and moved the slot to the head of the queue (i.e., LRU chain). At lines 77–78, statistics are collected. Finally, at line 79, the slot is returned to the caller.

(3) Flush

In an exemplary embodiment, the Flush method may be constructed as follows (using the C++ programming language).

```
1:  void s_bufman::Flush(hos_boolean unlockedOnly)
2:  {
3:      // error check
4:      hos_AutoMemCheck( );
5:      MustHaveRWAccess( );
6:
7:      if (!hos_lwtask::IsMainThread( ))
8:          // must be called from parent thread
9:          S_BUFMAN_THROW(BUFMAN_PROGERROR) ;
10:
11:     // Free up blockmaps (and unlock their s_bufs)
12:     // that aren't in use
13:     hos_mutexCatchLock   blockmapsLock(&_blockmapsMutex, _throwing) ;
```

```
14:     s_hashtb_iterator iterator(_blockmaps) ;
15:     while (iterator( ))
16:         {                           // delete blockmaps not in use
17:             s_blockmap* blockmap = (s_blockmap*) iterator.GetValue( ) ;
18:             if (!blockmap->Inuse( ))
19:                 DeleteBlockMap(blockmap, &blockmapsLock) ;
20:         }                           // delete blockmaps not in use
21:     blockmapsLock.UnLock( ) ;
22:
23:     // Flush the buffers
24:     _bufpool.Flush(unlockedOnly) ;
25:     // Will call into s_buf::write( )
26:
27:     _nflushes++;                    // stats
28:
29:     if (_blockmapBufman && !unlockedOnly)
30:         _blockmapBufman->Flush(unlockedOnly) ;
31: }    // Flush
```

The Flush method is invoked with a single parameter, unlockedOnly. This is a boolean, used for optimization, which indicates that only unlocked buffers should be flushed (as opposed to all buffers). At lines 3–5, the method performs error checking, including determining that read/write access is available (to this client). At line 7, the method determines whether it is on the main thread of execution, as the Flush operation is done from the main thread. At lines 11–21, the method frees up blockmaps which are not in use, including unlocking corresponding s_buf members (i.e., slots).

At line 24, the method does the actual Flush operation, by calling an internal _bufpool.Flush subroutine. In essence, the subroutine loops through the s_buf members, acquires necessary locks, performs error checking, and writes those which are "dirty." The actual write operations are performed by calling to s_buf::write (for each s_buf which is "dirty"), which in turn calls compression routines. Thus the call to the internal Flush will, if compression is activated, include an indirect call to the compression routines. Next, statistics are gathered, at line 27, and the blockmap is flushed, at line 30. Thereafter, the method is done and may return.

(4) Destroy

In an exemplary embodiment, a Destroy method of the present invention may be constructed as follows.

```
1:  void s_bufman::Destroy(s_bufPtr& sb)
2:  {                                   // Destroy
3:
4:      hos_AutoMemCheck( );
5:      MustHaveRWAccess( );
6:      s_buf* slot = sb;
7:      sb.Clear( );                    // so sb doesn't try to UnLock( )
8:
9:      hos_int logicalBlocks = slot->GetLogicalNBlocks( ) ;
10:
11:     hos_mutexCatchLock    sbufMutexLock(&slot->_mutex,_throwing) ;
12:
13:     // needs a check here to make sure _userlocks == 1
14:     slot->UnlockUserLocked( ) ;
15:
16:     /*
17:     Lock the hashtable to prevent another thread from picking
18:     up the freed block(s) and trying to register them in the
19:     hash table before we've deregistered it from the hash table.
20:     This lock is unfortunate, since deallocate may be non-trivial
21:     from a bio standpoint. The RIGHT thing to do is unregister
22:     the block in the hashtable before doing the deallocate.
23:     However, this is non-trivial in the current implementation.
24:     WARNING: PROBABLE THREADED PERFORMANCE BOTTLENECK
25:     */
26:
27:     hos_mutexCatchLock    hashtableLock(&_hashtableMutex, _throwing) ;
28:
29:     // See if we can deallocate it the quick way
30:     if (_allowQuickDrop && !slot->GetDirty( ) && slot->Destroy( ))
31:         {                           // did quick destroy
32:             _nqdestroys++;          // stats
33:             _nqdBlks += logicalBlocks ;  // stats
34:         }                           // did quick destroy
35:     else
36:         slot->Deallocate( );        // pre-image the slot
37:
38:     // This slot is to be eligible, but we're releasing
39:     // it's diskblock memory
```

-continued

```
40:    // The following 3 statements, plus the above hashtable lock,
41:    // used to be s_bufman::MoveSlotToEmptyList( )
42:
43:    _bufpool.MoveSlotToEmptyList(slot,
44:                               HOS_FALSE,    // release diskblock memory
45:                               HOS_TRUE,     // hashtable is locked
46:                               // callee shouldn't really need this
47:                               &_hashtableMutex,
48:                               _hashtable) ;
49:    hashtableLock.UnLock( ) ;
50:    _nBuffersInuse--;
51:
52:    sbufMutexLock.UnLock( );
53:
54:    _ndestroys++;              // stats
55:    _ndBlks += logicalBlocks;  // stats
56: }                             // Destroy
```

The method is invoked with a single parameter, a pointer to an s_buf. After error checking, at lines 4–5, the method stores the s_buf pointer into a local variable, slot. At line 7, the method clears the lock which the user has. At line 9, the method gets the number of logical blocks—that is, how big it is. At line 11, the method gets a mutex lock for the slot. At line 14, the method checks the user lock, making sure the user lock count equals 1. Since the buffer is being destroyed, the method unlocks the user lock at this point. At line 27, the method takes out a hash table mutex lock.

At lines 30–36, the method undertakes to actually destroy the slot. If "quick drop" (i.e., without logging) is allowed and the slot is not dirty (i.e., does not need to be written to disk), a slot Destroy method is invoked for actually destroying the slot. If the Destroy operation is successful, statistics are set at lines 32–33. Otherwise (e.g., when "quick drop" is not allowed), the method calls a Deallocate subroutine, at line 36. This subroutine will pre-image the slot before destroying it, thus allowing error recovery. By the time the method reaches line 38, the slot has been destroyed on disk; its space is returned to the free list or page manager. In a corresponding manner, the in-memory buffer is marked as destroyed. Now, the slot is moved from the "in-use" list to an "empty" list, by a subroutine call at line 43. The hash table entry is freed during the call to "destroy" the slot (either at line 30 or line 36, depending on whether "Quick-Drop" is allowed). The method concludes by releasing locks: the hash table lock is released at line 49 and the mutex lock is released at line 52. Statistics are collected (line 50 and lines 54–55). Thereafter, the method returns to the caller.

3. Detailed construction and operation of s_buf

In an exemplary embodiment, the s_buf class definition may be constructed as follows (using the C++ programming language).

```
1:    // s_buf class
2:
3:    class s_buf
4:    {
5:    friend class s_bm;
6:    friend class s_blockmap ;
7:    friend class s_bufcache ;
8:    friend class s_bufcacheitem ;
9:    friend class s_bufman;
10:   friend class s_bufman_exception ;
11:   friend class s_bufpool_ts ;
12:   friend class s_bufpool_MRU_iterator_tg ;
13:   friend class s_bufpool_LRU_iterator_tg ;
14:   friend class hs_bufADBM_tg ;
15:
16:   public:
17:
18:        void      LockUser( ); // Public use only for recursive locking
19:        void      UnlockUser( ) ;
20:        void      Dirty( );        // Do this BEFORE modify the buffer
21:
22:        /* Use GetBlock for a handle on the s_buf on disk */
23:        hos_uint  GetBlock( )      const    { return _block ; }
24:
25:        hos_int   GetBlockSize( )  const ;
26:
27:        hos_bio   *GetBioP( )      const
28:        {
29:            return _biop;
30:        }
31:
32:        s_btype   GetBType( )      const    { return _btype; }
33:        hos_int   GetChainedNBlocks( ) const
34:                  { return _diskdesc.GetTotalChainedBlocks( ) ; }
```

```
35:        void       *GetData( ) const { return __dskBlk->GetData( ); }
36:        /* GetNBlks is an undesirable export,
37:           use GetLogicalNBlocks instead */
38:        hos_int    GetNBlks( ) const
39:          { return __dskBlk->GetLogicalNBlocks( ) ; }
40:        hos_int    GetUserSize( ) const ;
41:        /* These are preferred over GetNBlks */
42: hos_int GetFirstNBlocks( ) const { return __dskBlk->GetFirstNBlocks( ); }
43:        hos_int    GetLogicalNBlocks( ) const { return __nLogicalBlks ; }
44:        hos_int GetPhysicalNBlocks( ) const
45:          { return __diskdesc.GetTotalBlocks( ) ; }
46:        void       MarkBlocksInUse(hs_xstats* stats)  const ;
47:
48: protected:                              // methods
49:
50:        s_buf(hos_memloc in_shrmem) ;
51:        ~s_buf( );
52:
53: private:                                // methods
54:
55:        s_buf( );
56:        s_buf&     operator=(const s_buf& rhs);
57:
58:        void       AllocateBlockMappedBlocks(hos_uint dataBytes,
59:                                             hos_boolean reregister) ;
60:        hos_byte*  AllocateDiskBlockMemory(hos_int nLogicalBlocks,
61:                                           hos_int blockSize) ;
62:        void       BumpNUsed( )    { __nused++; }
63:
64:        hos_byte*  Compress(hos_uint& compressedBytes) ;
65:        hos_boolean CompressionEligible( ) const ;
66:        hos_boolean CompressionRequested( ) const
67:                     { return __dskBlk->GetRequestedCompressionType( )
68:                       > HOS_CMPRST_NONE ; }
69:        void       Deallocate( ) ;
70:        void       Decompress(s_diskblockheader* tmpHeader) ;
71:
72:        void       DeleteDiskBlockMemory(s_diskblockheader*& sdbh) ;
73:
74:        hos_boolean Destroy( ) ; // do bio destroy instead of deallocate
75:        void DirtyInternal( ) ; // internal (unlocked) version of Dirty( )
76:        void       DropDiskBlocks(hos_boolean save_buffer);
77:
78:        static hos_uint debugBlockSum(s_diskblockheader*, hos_int) ;
79:        void       debugBlockHeader(const char*)  const ;
80:
81:        void       Dump(const hos_text *vn = 0)  const ;
82:        void       Dump(const hos_text *vn, hos_int idx)  const ;
83:        void       FreeExcessDiskBlocks(s_bufdiskdescriptor* desc,
84:                                        hos_uint bufBytes) ;
85:        // Internal GetBlock which doesn't require true IsUserLocked( )
86:        hos_uint    GetBlockInternal( ) const { return __block ; }
87:        s_blockmap* GetBlockMap( ) const    { return __blockmap ; }
88:        s_bufman*   GetBufMan( ) const      { return __bufman; }
89:        hos_int    GetDirty( ) const { return __flags & S_BUFDIRTY ; }
90:        hos_int GetIsMap( ) const { return __btype == S_BTYPE_BLOCKMAP ; }
91:        s_bufdiskdescriptor* GetDiskDescriptor( ) { return &__diskdesc ; }
92:
93:        // Generate blockmap sensitive hash key for the bufman
94:        void*      GetPrimaryKey( )  const ; // Bio or Blockmap ptr
95:        hos_uint   GetSecondaryKey( )  const
96:          { return __block ; } // logical or physical block id
97:        /* These return physical block id's */
98:        hos_uint   GetFirstBlockId( ) const
99:        hos_uint   GetChainedBlockId( ) const ;
100:
101:       /* This method is only for debugging */
102:       hos_uint   GetUnreliableFirstPhysicalBlockId( )  const
103:         { return (__dskBlk ? __dskBlk->GetBlock( ) : 0) ; }
104:
105:       hos_int    GetFlags( ) const        { return __flags; }
106:       s_buf*     GetNextYoungest( ) const { return __next; }
107:       s_buf*     GetPrevOldest( ) const   { return __prev; }
108:       hos_boolean HasPhysicalBlocks ( ) const
109:         { return __dskBlk->GetFirstBlockId( ) != 0 ; }
110:
111:       hos_boolean IsBlockMapped( ) const  { return __blockmap != 0 ; }
112:       hos_boolean IsUserLocked( ) const   { return __userlocks > 0; }
113:
114:       void       LockUserLocked( ) ;      // assumes __mutex is locked
```

```
115:    void        UnlockUserLocked( );    // assumes _mutex is locked
116:
117:    void        Lock( )
118:    {
119:        _mutex.Lock( );
120:    }
121:
122:    void        UnLock( )
123:    {
124:        _mutex.UnLock( );
125:    }
126:
127:    hos_boolean TryLock( )
128:    {
129:        return _mutex.TryLock( );
130:    }
131:
132:    void        MustBeActiveBufThrow(const hos_text *variant);
133:
134:    void        MustBeActiveBuf( )      // look for valid data
135:    {
136:        if (_dskBlk == 0 || GetBlockInternal( ) == 0)
137:            MustBeActiveBufThrow("Active");
138:    }
139:
140:    void        MustBeInactiveBuf( )    // most ivars should be zero
141:    {
142:        if (_biop != 0 || _block != 0)
143:            MustBeActiveBufThrow("Inactive");
144:    }
145:
146:    void        RawRead(s_diskblockheader *outputBuffer,
147:                    hos_uint blockId, hos_int nBlocks);
148:    hos_boolean Read( );
149:
150:    void        ReallocateBlockMappedBlocks(hos_uint dataBytes);
151:    void        ReallocateDiskBlocks(s_bufdiskdescriptor *have,
152:                    s_bufdiskdescriptor *willhave,
153:                    hos_int bufBytes);
154:
155:    void        Prepare(hos_bio* biop, hos_uint block, s_btype btype,
156:                    hos_int nBlks, hos_cmprstype ctype,
157:                    s_bufdiskdescriptor*);
158:    void        Prepare(s_blockmap*, hos_bio*, hos_uint logicalBlockId,
159:                    s_btype, hos_cmprstype);
160:
161:    void        PrepareDiskBlockMemory(hos_int nLogicalBlocks);
162:    void        PrepareToUpdateCompressedData( );
163:    void        PrepareToUpdateCompressedCachedData(s_bufcacheitem*);
164:
165:    void        SetBufferNumber(hos_uint bn) { _bufnu = bn; }
166:    void        SetBufMan(s_bufman *sbm) { _bufman = sbm; }
167:    void        SetBType(s_btype newbtype);
168:
169:    void        SetDirty( )             { _flags |= S_BUFDIRTY; }
170:
171:    void        SetNextYoungest(s_buf *sb)  { _next = sb; }
172:    void        SetPrevOldest(s_buf *sb)    { _prev = sb; }
173:
174:    void        SetUnDirty( )           { _flags &= ~S_BUFDIRTY; }
175:
176:    void        Validate(hos_uint Blk, hos_bio *biop,
177:                    hos_int nBlks, s_btype btype);
178:    hos_boolean Write(hos_boolean writeIfNoShrinkage = HOS_TRUE);
179:    void        WriteBufToDisk(void* buf, hos_uint bufBytes,
180:                    s_bufdiskdescriptor* desc);
181:
182: private:                               // instance variables
183:
184:    static hos_uint _debug ;    // block number want to debug, or zero
185:    static hos_uint _debugPhys ;// physical block number, or zero
186:    static hos_boolean _debugAll ; *// debug all block numbers
187:    static s_buf* _debugThis;   // debug particular s_buf by address
188:
189:    hos_mutex   _mutex ;                // Mutexes most ivars, but not all
190:
191:    // The following ivars are protected by the above mutex
192:
193:    hos_uint    _block;                 // The disk block number 1 based.
194:    hos_int     _nLogicalBlks;          // number of logical blocks in self
```

-continued

```
195:    hos_uint        _bufnu;                                     // The _bufman buffer use number.
196:    hos_bio*        _biop;                                      // ptr to bio file
197:    hos_uint        _nused;                                     // number of times this buffer was used
198:                                                                // since created or brought in from disk
199:    s_btype         _btype;                                     // The type of disk data block.
200:
201:    hos_byte        _flags;                                     // Flags ie. DIRTY,LOCKED
202:    // s_buf bits represented in the _Flag instance variable
203:
204:    //hos_ushort    _openCount ;                                // non-zero if mutex is locked
205:    hos_int         _userlocks;                                 // number of user locks
206:    s_diskblockheader*  _dskBlk;                                // The data read/written to disk.
207:    s_blockmap*     _blockmap ;                                 // logical<->physical block map ptr
208:
209:    // descriptor of disk blocks owned by buf
210:    s_bufdiskdescriptor _diskdesc;
211:
212:
213:    // The following ivars are protected by the s_bufpool mutex
214:
215:    s_buf*          _prev;                                      // The next buffer used for paging.
216:    s_buf*          _next;                                      // The prev buffer used for paging.
217:
218:    // The following ivars are manipulated in the parent thread and
219:    // are not subject to mutexing (largely read-only)
220:
221:    s_bufman*       _bufman;                                    // Parent manager that owns this buffer.
222:    hos_memloc      _in_shrmem;                                 // is in shared memory
223:    };
```

The s_buf class does not include a public constructor, since the end user cannot create an object instance of this class directly. Instead, the user indirectly creates an s_buf buffer through the s_bufman object. At the outset, the class declares a plurality of friend classes. This is an optimization, as before, so that data members of other classes may be accessed without using "wrapper" functions or methods.

In its public section, lines 16–46, the class declares several public methods. The first method, LockUser at line 18, is a public method employed for recursive locking. This method is typically not used, since the Create and Find methods return a locked buffer. The UnlockUser method, at line 19, is more often used, however. This class method is invoked when the user is done with the buffer (i.e., for that instance in time). The Dirty method, at line 20, is invoked before a buffer is modified. As previously described, this call "prepares" the buffer for modification—granting the user the privilege to modify the buffer.

The remaining public methods, from line 22 to line 46, largely perform housekeeping functions. The GetBlock method, at line 23, for instance, simply returns the block for the buffer. Similarly, GetBlockSize, at line 25 returns the size of the block. Other examples include GetBType, at line 32, which returns the page or buffer type (e.g., B-Tree page). The GetData method, at line 35, is an inline method which returns a pointer to the location in the buffer (s_buf) that the user of the buffer can place user data. In a corresponding manner, the GetUserSize method, at line 40, returns a value indicating the size of the region which the user is allowed to write to. The size, in combination with the GetData pointer, can be employed by the user in memory function calls (i.e., from the standard C runtime library).

At lines 48–51, two protected class methods are declared. Specifically, these comprise a protected constructor and a protected destructor. As shown, at line 50, the constructor is invoked with a single flag, in_shrmem, for indicating whether the object instance resides in shared memory. The destructor, shown at line 51, is simply implemented in a conventional C++ manner (e.g., for performing clean up).

Following this, the method declares or defines a private section, beginning at line 53. The first two methods declared thereat include a private constructor for the class (line 55) and a copy constructor (line 56). Following these constructors are numerous private methods of the class. Several of these are inline functions which simply return values of class data members (i.e., they serve as wrappers) and, thus, need not be described further. Accordingly, the following description will focus on those class members which are helpful to understanding the present invention.

The CompressionEligible method, at line 65, simply indicates whether a block is eligible for compression. Each page includes within its header a flag indicating this eligibility. A block might not be eligible, for instance, in the case where the user has indicated that compression should not be used. As another example, a block might not be eligible for compression when both its compressed size and uncompressed size are the same (e.g., one block) and, hence, no space savings can be realized by compression. The CompressionRequested method, at line 66, is an inline method indicating whether the user requested compression. It returns a boolean (true/false) value indicating whether the requested compression type is greater than "none."

Actual compression for the buffer is performed by the Compress method, at line 64. The method is passed by reference an integer parameter for storing the number of compressed bytes. The method returns a pointer to the compressed version. This private method is invoked by s_buf::write, thus providing the object with on-the-fly compression when the object is written to disk. The DirtyInternal method, at line 75, simply sets the "dirty" bit. This is an internal (unlocked) version of the class "Dirty" method. The Write method for the class is shown at line 178. It is invoked with a single parameter, a boolean indicating that the data is simply written if there is no shrinkage by compression (i.e., compression routines are not invoked). By default, the parameter is set to true. WriteBufToDisk, at line 179, undertakes the actual write (i.e., stream) of compressed data to disk.

Complementing the Write methods are the Read methods. Just as the Write methods compressed information on-thefly, the Read methods decompress information on-the-fly. In this manner, each Buffer Manager includes on-the-fly compression/decompression, which is transparent to the client which the buffer is servicing. The Read method for the class is declared at line 148. The method, during operation, invokes the Decompress method, shown at line 70. In conjunction with the Read method, the class also includes a RawRead method at line 146. This method is perhaps best thought of as a counterpart to the WriteBufToDisk method (previously shown at line 179). The RawRead method reads the raw data from disk—that is, before decompression is undertaken.

Following the private methods of the class are the private data members, set forth at lines 182–222. Most of the data members perform housekeeping functionality, as described by accompanying comments shown for each. Those relevant to the present invention are described in further detail.

The _block data member, at line 193, stores the block number. The _nLogicalBlks, at line 194, stores the number of logical blocks for a particular object instance. The _bufnu data member, at line 195, stores the particular slot being used by the buffer. The _biop data member, at line 196, stores a pointer to a particular bio file—a logical file. The _btype data member, at line 199, indicates what page type (e.g., bit map page) is associated with the buffer.

At lines 213–216, the class declares previous and next pointers through the data members _prev and _next, respectively. These are employed for hooking the object instance into the LRU chain. Finally, the class declares, at line 221, a _bufman data member which stores a pointer to the parent manager (i.e., bufman) that owns the buffer. At line 222, the class declares an _in_shrmem data member, which serves as a flag for indicating whether the object instance resides in shared memory.

B. Vertical column data structures and methods

In an exemplary embodiment, each vertical column (of a logical table) exists as an object created from an hs_dp class. The purpose of this class is to store and maintain data in cells in vertical columns. Specifically, the class includes functionality for inserting data into cells, deleting data from cells, and finding which cells have particular characteristics. More particularly, the data (i.e., cells) is stored vertically in columns, instead or horizontally as rows which, as previously described, has substantial impact on system performance for DSS tasks. An object instance of this class views its cells as beginning at cell number 1 and increasing monotonically. Each column of cells can, in turn, be tied into a framework to form a logical table. The hs_dp object relies on its Buffer Manager for performing the necessary I/O operations for retrieving data pages from the disk subsystem. The Buffer Manager operates in conjunction with a page manager or allocator for allocating or freeing pages on the disk subsystem.

1. Class definition

In an exemplary embodiment, the hs_dp class may be constructed as follows (presented in simplified form).

```
 1: class hs_dp
 2: {
 3: public:
 4:
 5: // ... Constructors and Destructors ...
 6:
 7:    void Insert(const void *key,hos_int klen,hos_uint recid);
 8:
 9: // fetch ...
10:
11: hos_boolean Find(const void *key,hos_int klen,hos_op op,
12:                                s_bm *fset, s_bm *nullset=0,
13:                                hos_boolop bool=HOS_NEW);
14:
15: // Housekeeping ...
16:
17: // Column operations: AVG, RANGE, SUM, MIN, MAX ...
18:
19: //
20:
21: // Find ( for key range ) ...
22:
23: // ... Misc Operators ...
24:
25: private:
26:
27: hos_bio *_Bio;              // I/O subsystem pointer.
28: S_bufman *_Bufman;          // Buffer Manager pointer.
29: hs_BArray _BArray;          // Database Page Storage Object.
30: const hos_text *_ColumnName; // Column Name
31: };
```

Of particular interest in the class is the Insert class method, shown at line 7. This method functions to assign data to cells in the column (for the particular object instance); the column itself may be comprised of an infinite number of cells. As shown, the method is invoked with three arguments: *key (pointer to key), klen, and recid. The key pointer points to the actual data (i.e., user data) to be inserted. The second argument, klen, is the key length—the length of the user data to be inserted. The third argument, recid, is the record or cell ID (number). To fill a column with data, for instance, the method would begin with cell number 1 and then proceeds to successive cell numbers. To insert a record into a table, therefore, a table-level object breaks the data down by column and then hands off each column value (user data) to a particular column object (i.e., object instance of hs_dp class). Each column object, in turn, invokes its Insert method for placing the user data into cells.

Also of particular interest in the hs_dp class is the Find method, shown at line 11. The first argument of the method is the *key (pointer to key). This represents a constant for which the system will find matching rows. The constant might include, for instance, a binary integer (e.g.,.foo=3), or it might be a text string (e.g., state=Massachusetts). The second parameter, klen, is the key length—that is, the length of the key (which itself might be variable). The third argument, op, specifies the type of operation (i.e., for the Find expression). Exemplary operations include equal to, not equal to, greater than, less than, and other comparison-type operations. Collectively, these first three parameters characterize the data which is to be found.

The fourth parameter of the Find method, fset, represents a (pointer to) bit map set which indicates the cells which hold true for the comparison. For instance, if the third cell held true, the third bit (logical or physical) in the set would be toggled to a "true" state (e.g., set to 1). In this manner, the method in essence returns a representation of the cell numbers or IDs which held true for the particular Find operation. The final two parameters to the method are nullset and bool. The former is employed for NULL set processing in SQL. The latter is a boolean employed for optimization purposes. If the system knows that it is going to take the given predicate and perform an AND operation with a previous predicate, this flag or boolean is set for indicating that the AND bitwise operation can be performed at the set level within the method (as opposed to copying the bit map up to a higher level for the operation).

The just-described Find method performs a Find operation for an unbounded range (e.g., greater than constant). A second version of the Find method may be created, as indicated by the comment at line 21, for finding cells which satisfy a bounded range.

Also shown, by the comment at line 17, each column object includes methods for performing column operations. Exemplary operations include AVG (average), RANGE, SUM, MIN (minimum value), MAX (maximum value), and the like. Other column operations include sorting (on a particular key value) and fetching data from the column. Once the data is stored in column format, as taught by the present invention, implementation of these operations is straightforward.

Recall that each Buffer Manager, apart from each column object, is performing compression/decompression on-the-fly. Because the data is broken up by column for storage—keeping all the cells for a column on a page (as opposed to rows)—the domain of the data is much better defined. Hence, the compression achieved is much better. In a preferred embodiment, each hs_dp object itself is essentially unaware of the compression/decompression being performed by the Buffer Manager. The compression/decompression functionality is thus transparent to each column object.

The data members for the hs_dp class, which are declared as private at lines 25–30, include the following. The _bio pointer, at line 27, is a pointer to the I/O subsystem (i.e., the subsystem which performs physical I/O operations). The _bufman pointer at line 28, is simply a pointer to the Buffer Manager, which services this particular object. This is followed by a _BArray at line 29, which is where the physical storage takes place. It presents a view of a contiguous array of database pages, with random access capability (for both storage and retrieval). The _ColumnName (pointer) data member, shown at line 30, points to a text string which stores the column name for this particular column. This is helpful, for instance, in providing users with the column name in the event of an error.

2. Exemplary methods

In an exemplary embodiment, an hs_dp::find method may be constructed as shown by the following pseudo code.

```
hos_boolean hs_dp::Find(const void *key, hos_int klen, hos_op op,
      s_bm *bm,s_bm *nullset, hos_boolop bool)
{
    while more cells to fetch
        check each cell for matching user criteria.
        build record list of cell numbers that match user criteria.
    endwhile
}
```

The basic operation of the method is as follows. While more cells remain in the column to fetch, the method checks each cell for a match to user criteria and builds a record list of cell numbers (e.g., bit map) that match the user criteria. In actual implementation (in the C++ programming language), a large switch statement is employed to provide data type cracking. The switch statement includes case arms for the different data types, so that appropriate data type treatment is provided. In essence, the method provides the comparison functionality as indicated by the above while statement. Also at this point, appropriate localization treatment (i.e., internationalization) is employed, for appropriate treatment of locale-specific data (e.g., character strings) for comparison operations.

In an exemplary embodiment, the Insert method may be constructed as follows (here, using a "helper" class, hs_dpInsert).

```
 1: void hs_dpInsert::Insert(const void *key, hos_int klen,
 2:                          hos_uint recid)
 3: {
 4:    // ... Misc setup work ...
 5:
 6:    // Calc. logical block number for this cell.
 7:    hos_uint Block=(recid-1)/_RecsPerBlock;
 8:    // Calc. Logical record number within a block.
 9:    hos_uint RecNumber=(recid-1)-(Block*_RecsPerBlock);
10:
11:    // Extend Column by (n) pages if neccessary.
12:    if(_CBlock != Block || _Record == 0) {
13:        for(;_NItems <= Block;_NItems++) {
14:            _DP—>_BArray.Extend( );
15:        }
16:        _Record=(hos_byte *)_BCursor[_CBlock=Block];
17:    }
18:
19:    // Mark database page has updated.
20:    _BCursor.Dirty( );
21:
22:
23:    // Move data from arguments into database page.
24:    switch(_DP—>GetDataType( )) {
25:    case hos_dtint:
26:    case hos_dtuint:
27:    case hos_dtshort:
28:    case hos_dtushort:
29:    #ifdef HOS_LONG
30:    case hos_dtlong:
31:    case hos_dtulong:
32:    #endif
33:    case hos_dtubyte:
34:    case hos_dtsbyte:
35:    case hos_dtfloat:
36:    case hos_dtdouble:
37:    case hos_dtdate:
38:    case hos_dttime:
39:    case hos_dtdatetime:
40:        hos_memcpy (_Record+(RecNumber*_MaxKeySize),
41:            key,_MaxKeySize);
42:        break;
43:    case hos_dtchar:
44:        {
45:        hos_byte *R=_Record+(RecNumber*_MaxKeySize);
46:        hos_memcpy (R,key,klen);
47:        // Handle padding with blanks.
48:        if(klen < _MaxKeySize) {
49:            R+=klen;
50:            hos_memset(R,' ',_MaxKeySize-klen);
51:        }
52:        }
53:        break;
54:    case hos_dtvchar:
55:        {
56:        hos_byte *R=_Record+(RecNumber*_MaxKeySize);
57:        *R++ = klen;
58:        hos_memcpy(R,key,klen);
59:        }
60:        break;
61:    default:
62:        {
63:        hs_dpexception ep(HOS_FILE_,HOS_LINE_,
64:            hs_dpexception::PROGERROR);
65:        Throw(ep);
66:        }
67:    }
68: }
```

After miscellaneous setup (as indicated by the comment at line 4), the method calculates for this cell (from the cell ID)

which page or block number the cell resides. This is done, at line 7, by an integer divide using cells per page (i.e., _RecsPerBlock). The method next, at line 9, determines the logical cell number (record number) for the cell within the block or page. After these calculations, the method knows the particular block or page and the offset within that page where the cell resides.

At lines 11–17, the method tests whether the calculated logical block and logical record number for the cell "fell off the end"—exceeded that which is presently available. In such a case, the system adds a new page (i.e., extends the array of pages), at line 14, for storing the cell. At line 16, the method repositions the cursor (i.e., cursor on the table) to the new position of the just-extended page array. After this re-positioning, the method marks the page as "dirty" at line 20, in preparation for inserting data into the page. As previously described, an exemplary Dirty method in the system of the present invention employs a pre-imaging strategy, where the method first pre-images the block if it were an existing block (e.g., for error recovery).

At lines 23–67, the method declares a switch statement for moving data from arguments (of the method) into the database page. The switch statement switches by data type, for example, by integer, float, date/time, and the like. Each case arm ultimately calls into a memcpy function (i.e., standard C library function) for performing a memory copy operation of the appropriate data size. After this copy operation, the method is done and may return.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a computer system having a database storing a database table, said database table presenting user information as rows of data records divided into columns of information, each column representing a particular category of information, a method for storing the database table by vertically partitioning each and every column of the database table without regard to storage devices available to the system, the method comprising:

irrespective of storage devices available to the system, creating for each column of the database table at least one associated data page for storing data values for the column;

for each data record of the database table, storing the data value for each column of the data record in one of the at least one data page associated with the column, so that data values for each particular column of a database table are all stored together in at least one data page associated with said each particular column; and for each column, linking together all of said at least one data page associated with the column to form a page chain for the column, so that each page chain stores together all of the data values for a particular column of the database table.

2. The method of claim 1 wherein some of the data pages for a given page chain are stored contiguously on a storage device.

3. The method of claim 2, further comprising:

receiving a query which requires the database to retrieve from storage all of the data pages for a particular column; and retrieving the data pages for the particular column using large block input/output transfer for the computer system.

4. The method of claim 3, wherein each data page stores 64K of data values and wherein said large block input/output transfer includes retrieving a 64K data page in a single read operation.

5. The method of claim 1, further comprising:

receiving a query for testing the data values of a particular column against a user-specified query condition; and when executing the query, retrieving only the data pages associated with the particular column.

6. The method of claim 1, wherein said linking step includes:

storing in each data page a pointer for referencing another data page storing data values for the same column, thereby forming a page chain of data pages for each column.

7. The method of claim 1, further comprising:

storing a system catalog referencing the first data page of each page chain, so that a logical view of the database table in row/column format can be reconstructed by retrieving data values from said page chains.

8. The method of claim 7, further comprising:

receiving a user request to alter the database table by deleting a particular column; and satisfying said user request by deleting the column from the system catalog and freeing storage occupied by data pages for the particular column.

9. The method of claim 7, further comprising:

receiving a user request to alter the database table by adding a new column; and satisfying said user request by creating a new page chain for the new column and adding the column to the system catalog.

10. The method of claim 1, further comprising:

receiving a user request for performing an aggregation operation on a particular column of the database table; and satisfying the user request by successively retrieving the data pages associated with the particular column and applying the aggregate operation to successive ones of the data values stored on each of the data pages retrieved.

11. The method of claim 10, wherein the aggregate operation includes a selective one of average value, maximum value, minimum value and summation of values, for the particular column.

12. The method of claim 10, wherein said retrieving step is accomplished by retrieving only the data pages associated with the particular column.

13. The method of claim 10, wherein the aggregate operation includes a selective one of an SQL AVG, MAX, MIN, and SUM operation, for the particular column.

14. The method of claim 1, wherein each data page includes a page header specifying a particular type of compression which is suitable for the data values stored on the data page.

15. The method of claim 14, further comprising:

compressing the data values stored on each data page according to the type of compression specified by the page header for the data page.

16. A database system comprising:

a computer having at least one processor and a memory;

a storage device for storing a database table;

a display device for presenting said database table to a user in row and column format;

means for creating a vertical partition for each and every column of the database table, each vertical partition having data values for only a single column of the database table; and means for transferring each vertical partition to and from the storage device, so that at least some data values for a particular column are stored together at a contiguous location on the storage device wherein said means for creating a vertical partition for each column includes:

forming a vertical page chain for each column, said vertical page chain storing only those data value of the records which correspond to the column for the page chain.

17. The system of claim 16, wherein each column comprises a category of information of the database table.

18. The system of claim 17, wherein each row comprises a record of the database table storing particular data values for each category of information.

19. The system of claim 16, wherein at least one column comprises data values having a fixed length and wherein the data pages for said at least one column store data values in fixed-length cells.

20. The system of claim 16, further comprising:

query processing means for receiving a user query about data values stored in a particular column, said query processing means including means for executing the query by scanning only the data pages for the particular column.

21. The system of claim 16, further comprising:

data compression means for compressing each data page according to a type of compression specified on a page-by-page basis.

22. The system of claim 21, wherein said type of compression is selected from leading key compression, LZS compression, LZW compression, and Run-Length Encoding compression.

23. The system of claim 16, wherein said means for transferring includes:

large block transferring means for retrieving data values of a particular vertical partition as a single large block.

24. The system of claim 23, wherein said single large block comprises a 64K storage block.

* * * * *